United States Patent [19]

Herd et al.

[11] Patent Number: 5,493,010
[45] Date of Patent: Feb. 20, 1996

[54] SO₂-CONTAINING FIBER-REACTIVE AZO DYESTUFFS

[75] Inventors: Karl-Josef Herd, Odenthal; Konrad Bootz, Wetter; Eckhard Bock; Manfred Hoppe, both of Kürten; Klaus Kunde, Neunkirchen; Wolfram Reddig, Leverkusen, all of Germany

[73] Assignee: Bayer Aktiengesellschaft, Leverkusen, Germany

[21] Appl. No.: 214,732

[22] Filed: Mar. 17, 1994

[30] Foreign Application Priority Data

Mar. 24, 1993 [DE] Germany .................. 43 09 554.2

[51] Int. Cl.⁶ .................. C09B 62/507; C09B 62/08; D06P 1/384; D06P 1/382
[52] U.S. Cl. .................. 534/642; 534/566; 534/571; 534/637; 534/638; 534/641
[58] Field of Search .................. 534/566, 571, 534/637, 638, 641, 642

[56] References Cited

U.S. PATENT DOCUMENTS

| | | | |
|---|---|---|---|
| 3,369,013 | 2/1968 | Weaver et al. | 534/641 X |
| 3,415,810 | 12/1968 | Straley et al. | 534/641 X |
| 3,585,182 | 6/1971 | Straley et al. | 534/607 |
| 4,430,259 | 2/1984 | Mischke et al. | 534/642 |
| 4,591,634 | 5/1986 | Herd et al. | 534/570 |
| 4,960,872 | 10/1990 | Schläfer et al. | 534/642 |
| 5,026,847 | 6/1991 | Tzikas | 544/76 |
| 5,102,993 | 4/1992 | Schlater et al. | 534/641 X |
| 5,319,074 | 6/1994 | Reddig et al. | 534/638 X |
| 5,334,709 | 8/1994 | Dannheim et al. | 534/641 X |

FOREIGN PATENT DOCUMENTS

| | | |
|---|---|---|
| 0043439 | 1/1982 | European Pat. Off. . |
| 0520241 | 12/1992 | European Pat. Off. . |
| 46-2425 | 1/1971 | Japan .................. 534/641 |
| 779781 | 7/1957 | United Kingdom . |
| 1302519 | 1/1973 | United Kingdom . |

OTHER PUBLICATIONS

Chemical Abstract, 41–Dyes, P. 101, vol. 114, 1991; CA#83883m: "Fiber–reactive water–soluble azo dyes", R. Haehnle, DE 3,905,270.

Chemical Abstract, 41–Dyes, P. 109, vol. 115, 1991; CA#10846n: "Water–soluble reactive, urea moiety—containing . . . ", H. Springer, et al, EP 407,871, DE 3,922,503.

Primary Examiner—Joseph K. McKane
Assistant Examiner—Fiona T. Powers
Attorney, Agent, or Firm—Sprung Horn Kramer & Woods

[57] ABSTRACT

The dyestuffs of the formula

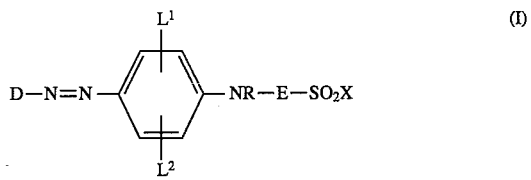

in which
  D is the radical of a diazo component,
  SO₂X is the radical of a fibre-reactive group,
and the remaining substituents have the meaning given in the description
are suitable for dyeing and printing hydroxyl- and amido-containing materials.

12 Claims, No Drawings

SO₂-CONTAINING FIBER-REACTIVE AZO DYESTUFFS

The invention relates to novel fibre-reactive azo dyestuffs, to their use for dyeing and to intermediates for preparing the dyestuffs.

Fibre-reactive azo dyestuffs have already been known for a long time; see the following applications: DE 3,905,270, EP 407,871, EP 520,241, EP 51,808, DE 3,703,565, EP 365,482 and DE 1,911,427. U.S. Pat. No. 3,585,182 describes triazoloazo compounds which are said to be suitable for dyeing polyesters.

The object of the invention was to provide novel improved dyestuffs.

The invention relates to reactive dyestuffs of the structure (1)

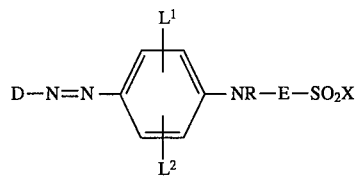

(1)

in which

D denotes the radical of a diazo component

X together with the $SO_2$ group denotes the radical of a fibre-reactive group, X being in particular $CH_2CH_2$—$S_2O_3H$, $CH_2CH_2OCOCH_3$, $CH_2$—$CH_2$—$OPO_3H_2$, $CH_2CH_2Cl$, $CH_2CH_2OH$ and especially $CH$=$CH_2$, $CH_2CH_2OSO_3H$, $L^1$ denotes H, $C_1$–$C_4$-alkyl, $C_1$–$C_4$-alkoxy, $CO_2H$, NHCO—$C_1$–$C_4$-alkyl, $NHCONH_2$ or halogen, L2 denotes H, $SO_3H$, $C_1$–$C_4$-alkyl or $C_1$–$C_4$-alkoxy, R denotes H, $C_1$–$C_4$-alkyl, $CH_2CO_2H$, $CH_2CH_2CO_2H$, $CH_2CH_2SO_3H$, $CH_2CH_2OH$, $CH_2CH_2OSO_3H$ or —E—$SO_2X$, E denotes —$(CH_2$—$CH_2$—$O)_i$—$(CH_2)_r$—, i being 0 or 1 and r being 2 or 3, the dyestuff containing at least one water-solubilizing group.

Preferred groups of this type are sulpho groups, carboxyl groups and sulphato groups.

In a preferred embodiment, D is the radical of a diazo component from the benzene, naphthalene or azobenzene series which is unsubstituted or substituted by substituents customary in reactive dyestuffs, in particular sulpho, carboxyl, $C_1$–$C_4$-alkyl, $C_1$–$C_4$-alkoxy, halogen, in particular chlorine, bromine or fluorine, or nitro. The radical D can also be substituted by fibre-reactive groups, such as vinylsulphonyl groups $SO_2X$ or halogen-containing pyrimidine or triazine derivatives, but preferably by $SO_3H$ and $SO_2C_2H_4OSO_3H$.

In another preferred embodiment, the radical D has the formula

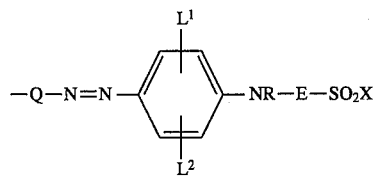

in which $L^1$, $L^2$, R, E and X have the abovementioned meaning and

Q is a bivalent aromatic or heteroaromatic radical, in particular a carbocyclic or heterocyclic middle component typical of disazo dyestuffs, such as, for example, a radical of the structure

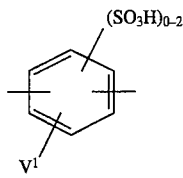

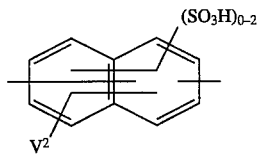

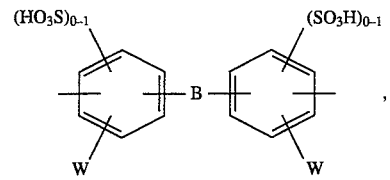

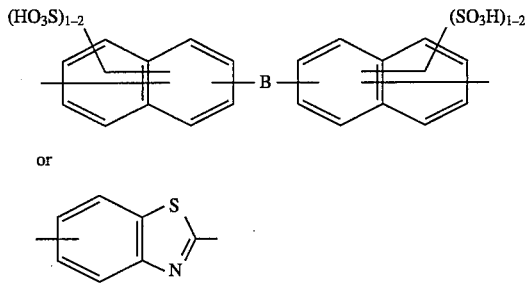

or

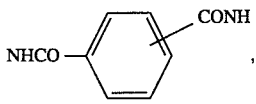

where $V^1$, $V^2$, W, independently of one another, are hydrogen or a substituent typical of carbocycles, in particular $C_1$–$C_4$-alkyl, $C_1$–$C_4$-alkoxy, halogen or carboxyl, B is a direct bond or a bridging member, such as, for example, $CH_2$, $CH_2$—$CH_2$, $CH$=$CH$, $C$≡$C$, O, S, SO, $SO_2$, CO, $CO_2$, $OCH_2CH_2O$, $CH_2$—O—$CH_2$, $CH_2CH_2OCH_2CH_2$, NHCO, NHCONH, $NR^1$, N=N, N=N→O, O←N=N→O, NHCOCONH,

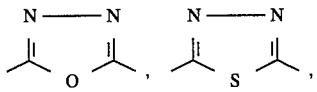

or a triazinyl radical of the structure

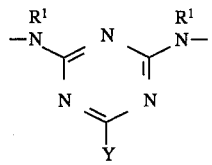

in which each $R^1$ independently of the other, is H or $C_1$–$C_4$-alkyl and

Y is F, Cl, Br, $OR^2$, $SR^2$, $NR^3R^4$, $R^2$ is H, $C_1$–$C_6$-alkyl, OH—, halogen-, $C_1$–$C_4$-alkoxy-, $CO_2H$—, $SO_3H$— or $OSO_3H$-substituted $C_1$–$C_6$-alkyl, cyclohexyl, furfuryl, phenyl, OH—, $CO_2H$—, $SO_3H$—, $C_1$–$C_4$-alkyl- or $C_1$–$C_4$-alkoxy-substituted phenyl or OH—, $CO_2H$— or $SO_3H$-substituted or unsubstituted naphthyl, $R^3$, $R^4$, independently of one another, are hydrogen, $C_1$–$C_6$-alkyl, $C_1$–$C_4$-alkenyl, halogen-, OH—, $CO_2H$—, $SO_3H$—, $OSO_3H$—, methoxy-, ethoxy-, $SO_2X$— or $OCH_2CH_2SO_2X$-substituted $C_1$–$C_6$-alkyl, cyclohexyl, cyclopentyl, benzyl, phenyl or naphthyl, or are $C_1$–$C_4$-alkyl-, $C_1$–$C_4$-alkoxy-, halogen-, $CO_2H$—, $SO_3H$—, $SO_2X$— or $CH_2SO_2X$-substituted phenyl, benzyl or naphthyl, it being possible for $R^3$ and $R^4$ together with the N atom to form the radical of a 5- or 6-membered heterocycle, such as, for example,

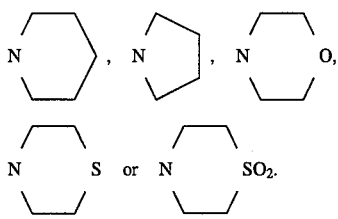

Preference is given to dyestuffs of the structure (2)

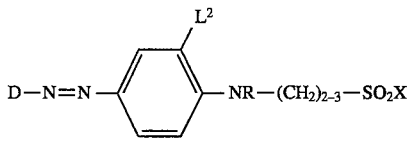 (2)

in which $L^2$ is H or $SO_3H$

X is $CH{=}CH_2$ or $CH_2CH_2OSO_3H$,

R is H or $(CH_2)_{2-3}$—$SO_2X$, and D has the abovementioned meaning.

Particular preference is given to dyestuffs of the structures (3) to (13)

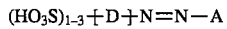 (3)

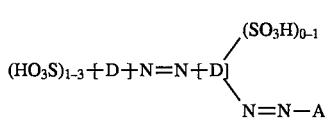 (4)

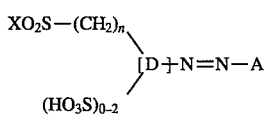 (5)

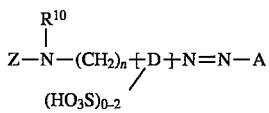 (6)

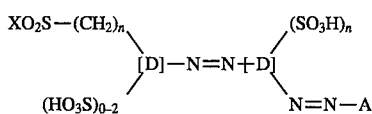 (7)

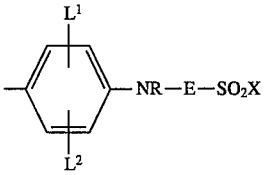 (8)

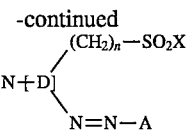 (9)

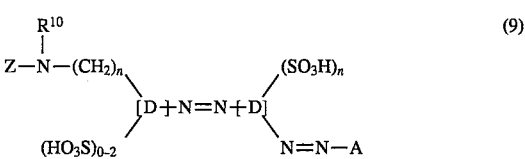 (10)

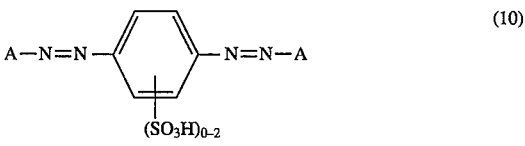 (11)

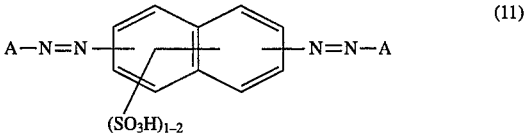 (12)

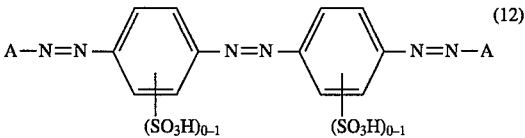 (13)

in which

A denotes

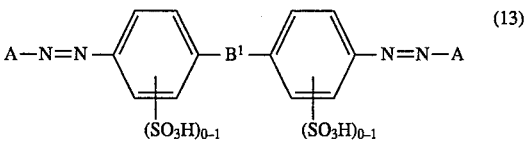

n denotes 0 or 1

$R^{10}$ denotes H or $C_1$–$C_4$-alkyl,

Z denotes a fibre-reactive halogen-containing radical from the triazine or pyrimidine series, and D denotes phenylene or a naphthylene radical which may be additionally substituted by carboxyl, methyl, ethyl, methoxy, ethoxy, chlorine, bromine or fluorine, it being possible for the two groups D in formula (6), (7) and (8) to have the same or different meanings, and $B^1$ denotes a direct bond or $CH_2CH_2$, $CH{=}CH$, CO, $SO_2$, NHCONH or a triazinyl radical of the structure

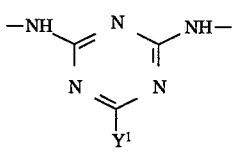

in which $Y^1$ is Cl, F, OH or $NR^3R^4$, and R, X, $L^1$, $L^2$, E, $R^3$ and $R^4$ have the meaning mentioned in formula 1) or 2).

The fibre-reactive radical Z represents those chlorine- or fluorine-containing triazine or pyrimidine radicals as are described, for example, in EP-A 395,951, preferably a monofluoro- or monochlorotriazine radical or a 5-chloro-2,6-difluoro-4-pyrimidinyl or a 5-chloro-6-fluoro-4-pyrimidinyl radical.
Selected dyestuffs are those of the structures (14) to (33)
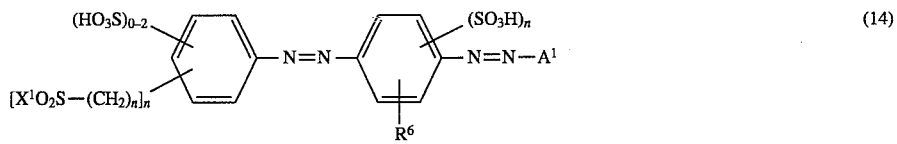
(14)
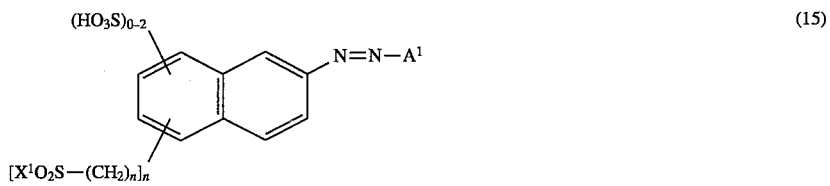
(15)
(16)
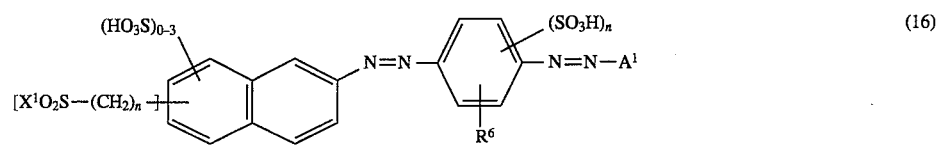
(17)
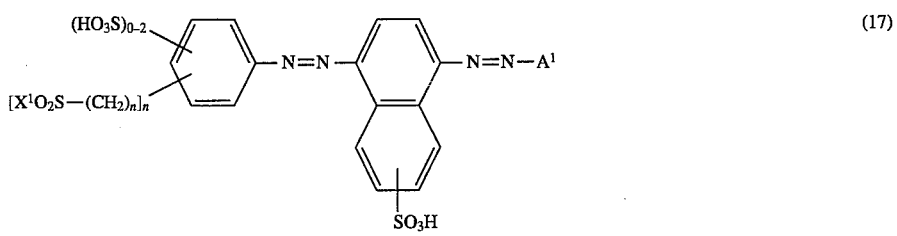
(18) (19)
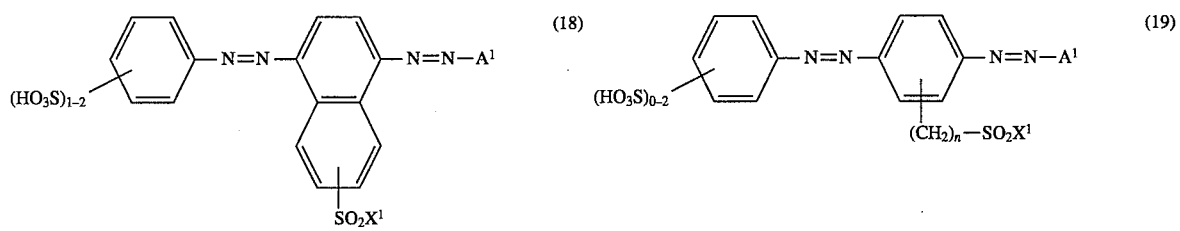
(20)
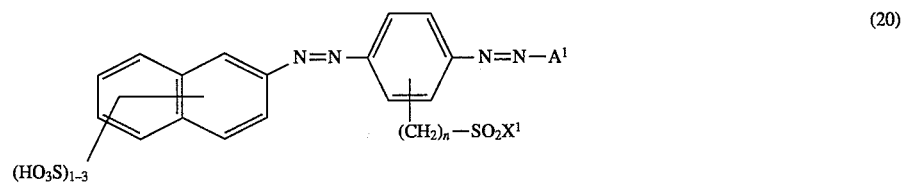
(21) (22)
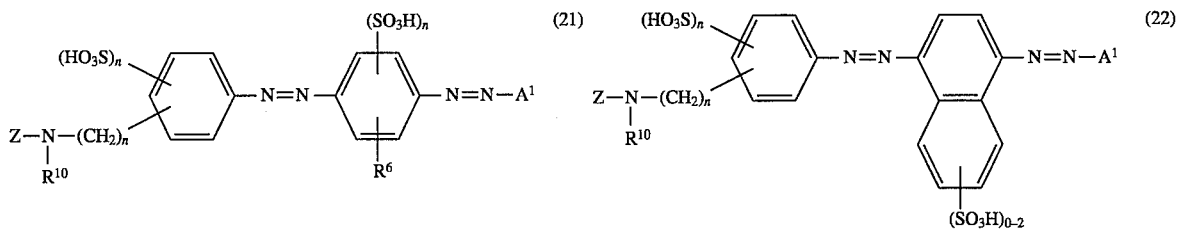

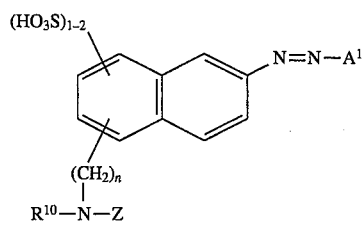

(23)

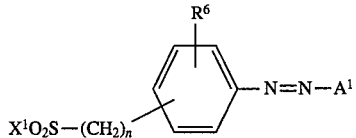

(24)

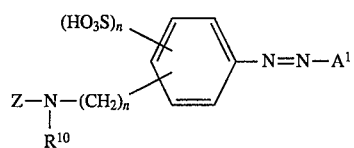

(25)

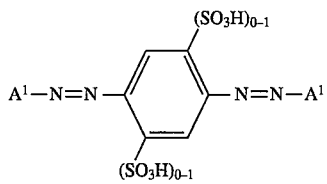

(26)

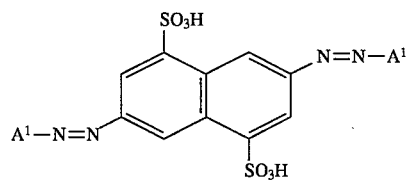

(27)

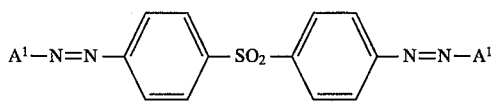

(28)

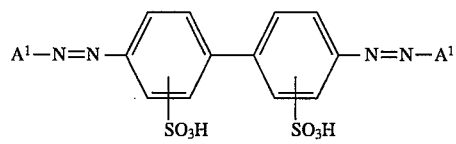

(29)

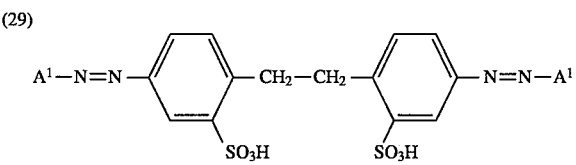

(30)

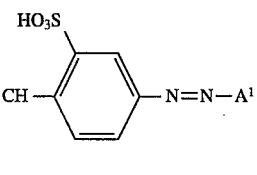

(31)

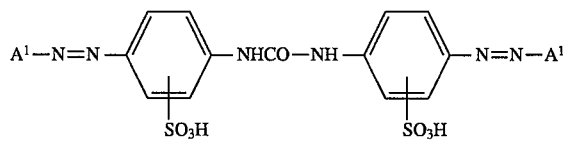

(32)

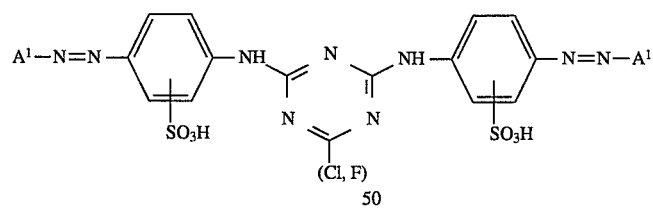

(33)

in which

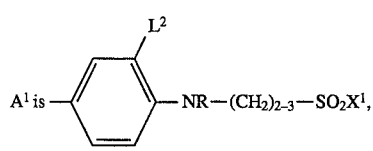

$L^2$ is H or $SO_3H$
R is H or $-(CH_2)_{2-3}-SO_2X$
$R^6$ is H, $CH_3$, $OCH_3$, Cl, $SO_2X^1$ or $CH_2SO_2X^1$
$X^1$ is $-CH=CH_2$ or $-C_2H_4-OSO_3H$
and Z, n and $R^{10}$ have the abovementioned meaning.

The novel dyestuffs can be prepared by various methods which are also a subject of the invention:

1. Sulphation of the non-fibre-reactive hydroxylethyl group-containing intermediates of the structure (34),

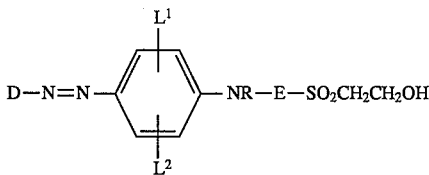

(34)

it being possible for the substituent X of the $SO_2X$ radicals in D also to have the meaning of $CH_2CH_2OH$, to give fibre-reactive dyestuffs of the structure (1) where X is $CH_2CH_2OSO_3H$ and, if desired, conversion of these dyestuffs under weakly alkaline conditions into those of the structure (1) where X is vinyl.

The intermediates (34) are obtained by diazotization/ tetrazotization of diazo components D-NH$_2$ or tetrazo components NH$_2$—Q—NH$_2$ and coupling of the resulting diazonium salts onto coupling components of the structure (35)

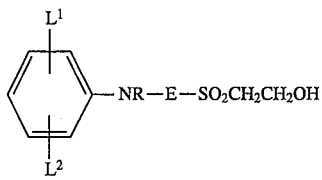  (35)

2. Sulphonation of dyestuffs of the structure (1a)

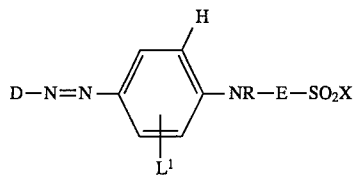  (1a)

or of the structure (2) where L$^2$ is H to give novel dyestuffs of the structure (1b)

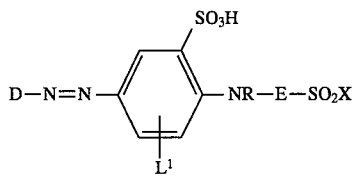  (1b)

or to give dyestuffs of the structure (2) where L$^2$ is SO$_3$H.

3. Sulphonation and sulphation of intermediates of the structure (34a)

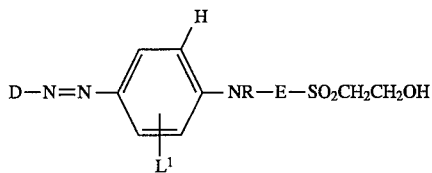  (34a)

it being possible for the substituent X of the SO$_2$X radicals in D also to have the meaning of CH$_2$CH$_2$OH, to give fibre-reactive dyestuffs of the structure (1b) where X is CH$_2$CH$_2$OSO$_3$H and, if desired, conversion of these dyestuffs under weakly alkaline conditions into those of the structure (1b) where X is vinyl.

4. Diazotization/tetrazotization of diazo components D-NH$_2$ or tetrazo components NH$_2$—Q—NH$_2$ and coupling of the resulting diazonium salts onto coupling components of the structure (36)

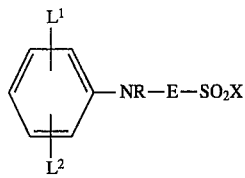  (36)

Compounds (35) are available by substitution of compounds of the structure (37)

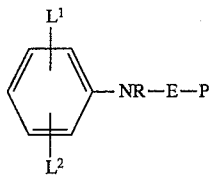  (37)

P being Cl, Br, OSO$_3$H or OCOCH$_3$, with mercaptoethanol, followed by oxidation to the sulphone. Intermediates (36) are obtained by selective derivatization of the hydroxyethyl radical in compounds (35) by known methods.

Compounds (37) are available by substitution of suitable compounds where P is OH.

5. Reactive dyestuff (1) containing an additional substituent Z in the diazo radical D, such as, for example, those of the structure (6), can be prepared by condensing intermediates of the structure (38),

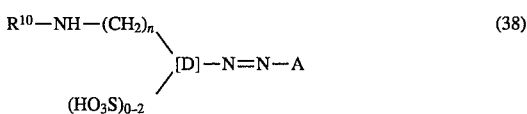  (38)

which can be prepared as described above, with a heterocyclic reactive component Z-Hal, in which Hal is Cl or F, in the presence of acid-binding agent in a known manner. This synthesis technique can also be applied to dyestuffs of the structure (9).

6. Diazotization of intermediates of the structure (39)

NH$_2$—Q—N=N—A  (39)

and coupling of the resulting diazonium salts onto coupling components of the structure (36).

7. Condensation of two equivalents of the compound (40)

R$^{10}$—NH—Q—N=N—A  (40)

with carbonic acid derivatives, such as, for example, phosgene, with oxalyl chloride, terephthaloyl chloride and with triazines of the structure (41)

  (41)

in which Hal is Cl or F and

Y has the meaning already mentioned above, or else with triazines of the structure (42)

  (42)

which, in the latter case, can be followed by condensation with HOR$^2$, HSR$^2$ or HNR$^3$R$^4$.

The intermediates (39) and (40) are available, for example, by reducing nitro compounds of the structure (43, G=NO$_2$) or hydrolysing N-acyl derivatives (43, G=NR$^1$—COCH$_3$; NR$^1$CHO).

G—Q—N=N—A  (43)

Compounds (39) and (40) where X is CH$_2$CH$_2$OH can also be sulphated, prior to condensation, to give intermediates of the structure (39) and (40) where X is CH$_2$CH$_2$OSO$_3$H.

8. Trisazo/azoxy dyestuffs, such as, for example, those of the structure (12), are obtained by reductive combination of the nitroazo compounds (43, G=NO₂) with mild reducing agents, such as, for example, glucose, maltose or sucrose. Sulphation reactions are preferably carried out using concentrated sulphuric acid, sulphuric acid monohydrate, oleum or sulphur trioxide. To reduce the nitroazo compounds to the corresponding aminoazo compounds, sodium sulphide or sodium hydrogen sulphide are preferably used. Diazotization, tetrazotization and azo coupling reactions are carried out by methods known from the literature.

The formulae given are those of the free acids. In the preparation, the salts are usually obtained, in particular the alkali metal salts, such as sodium salts, potassium salts or lithium salts.

The novel dyestuffs according to the invention are suitable for dyeing and printing hydroxyl- and amido-containing materials, in particular wool and cellulose materials. They are distinguished by high reactivity and a high degree of fixation. Furthermore, the yellow, orange and brown dyeings and prints obtainable by means of these dyestuffs are distinguished by a high stability of the fibre-to-dyestuff bond and by excellent stability to oxidizing agents, such as peroxide- or chlorine-containing detergents.

The dyestuffs can be used either as solid formulations or as concentrated solutions and can be purified by ultrafiltration.

They are also suitable in mixtures with other reactive dyestuffs, in particular for trichromatic mixtures.

EXAMPLE 1

23.6 g of 7-amino-1,3-naphthalenedisulphonic acid monosodium salt are stirred in 150 ml of water/50 g of ice and 20 ml of concentrated hydrochloric acid, and 17 ml of a sodium nitrite solution (300 g/l) are added dropwise at 5° to 10° C. After 1.5 hours, diazotization is complete. The small excess of nitrite is destroyed by addition of sulphamic acid. The cream-coloured suspension is brought to a pH 2.5 with sodium carbonate solution. A solution of 14.3 g of the compound of the formula

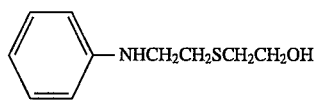

in 100 g of ice and 100 g of water adjusted to a pH of 2.0 is added dropwise to this suspension at 0°–5° C. The reaction mixture is stirred at 5° C. for 4 to 5 hours (pH 2.0–2.5). In order to complete the coupling reaction, the pH is increased to 4.5 by addition of sodium acetate, and stirring is continued for another 2 hours. 40 g of sodium chloride are added, the mixture is stirred for 1 hour, and the precipitate is isolated by suction filtration. Drying gives 45 g of a salt-containing dyestuff of the formula

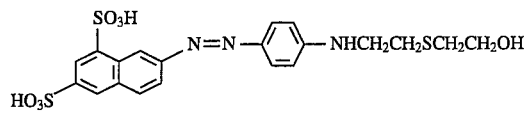

$\lambda_{max}$=428 nm (H₂O, pH 7–8)

EXAMPLE 2 a) 43 g of the dyestuff from Example 1 are stirred into 250 ml of water at a pH of 8–8.5, 0.2 g of sodium tungstate is added, and the mixture is heated to 70° C. 30 ml of an approximately 35% strength aqueous hydrogen peroxide solution are added dropwise. During this addition, the temperature should be between 70° and 80° C. After 2 hours, the oxidation is checked by thin-layer chromatography. This test also allows the sulphoxide derivative passed through during oxidation to be detected. If necessary, another 10 to 15 ml of hydrogen peroxide solution are added in order also to oxidize the remaining sulphoxide derivative to the sulphone derivative. The mixture is then stirred at 80° C. for 2 hours, cooled to room temperature, and acidified with dilute sulphuric acid to a pH of 0.5 to 1.0. The dyestuff is salted out with 35 g of sodium chloride and 5 g of potassium chloride and isolated. Drying gives 36 g of a salt-containing dyestuff of the formula

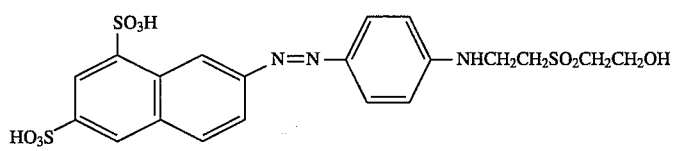

$\lambda_{max}$=422 nm (H₂O, pH7–8)

b) The same dyestuff is also obtained by coupling the diazonium salt from Example 1 directly onto the oxidized form of the coupling component

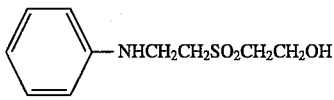

under the reaction conditions listed in Example 1.

EXAMPLE 3 a) 35 g of the dyestuff from Example 2 are introduced in portions and with stirring at 15°–25° C. into 100 ml of sulphuric acid monohydrate, and the resulting mixture is stirred at 20°–25° C. for 2 hours. The red solution is then poured onto 250 g of ice and 50 ml of water, and the dyestuff is salted out with 30 g of sodium chloride and isolated by suction filtration. The moist dyestuff paste is stirred in 150 ml of ice water, and the mixture is neutralized with solid sodium bicarbonate. The product is filtered off with suction and dried to give 40 g of a salt-containing red-brown reactive dyestuff powder which dyes cotton in golden yellow shades and has the structure

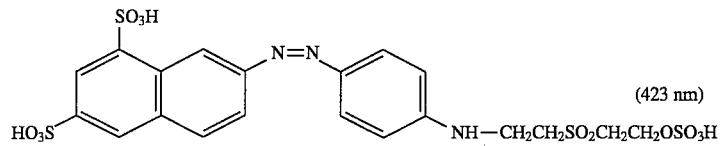

(423 nm)

b) The same reactive dyestuff is obtained by coupling the diazonium salt from Example 1 directly onto the sulphated form of the coupling component

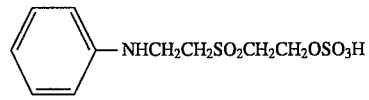

under the reaction conditions listed in Example 1.

EXAMPLE 4

If preparation of the above dyestuffs is followed by sulphonation, it is possible to prepare dyestuffs having a particularly high fastness level.

For example, 35 g of the dyestuff from Example 3 are introduced in portions into 100 g of 20% strength oleum with stirring at 20° C., and the resulting mixture is heated at 50° to 60° C. for 2 to 3 h. After cooling to 20° to 25° C., the solution is poured onto 200 g of ice and 50 g of water, the dyestuff is salted out with 40 g of sodium chloride and isolated by suction filtration to give, after drying, 38 g of a reactive dyestuff powder having the structure

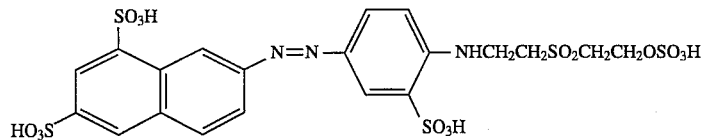

$\lambda_{max}$=414 nm (H$_2$O, pH 7–8)

The same dyestuff is also obtained by adding 60 g of 65% strength oleum to the sulphuric acid monohydrate solution from Example 3 and then sulphating the resulting mixture as described above, followed by workup.

By varying the diazo components in Examples 1 to 4, further interesting dyestuffs can be prepared analogously to the synthesis procedures listed there:

| D | Ex. (D—N=N—C6H4—NH—CH2CH2—SO2—CH2CH2—OSO3H) | $\lambda_{max}$ (H$_2$O, pH 7-8) | Ex. (D—N=N—C6H3(SO3H)—NH—CH2CH2—SO2—CH2CH2—OSO3H) | $\lambda_{max}$ (H$_2$O, pH 7-8) |
|---|---|---|---|---|
| phenyl (2) | — | — | — | — |
| 2-CO$_2$H-phenyl | 7 | 386 | 8 | 379 |
| 2-SO$_2$H-phenyl | 9 | 394 | 10 | 385 |
| 4-HO$_3$S-phenyl | 11 | 417 | 12 | 407 |
| 6-HO$_3$S-naphth-2-yl | 13 | 428 | 14 | 419 |
| 4,8-di-SO$_3$H-naphth-2-yl | 15 | 422 | 16 | 414 |

EXAMPLE 17

20.4 g of 4-(sulphatoethylsulphonyl)-aminobenzene are diazotized by the procedure of Example 1, and the resulting suspension is brought to a pH of 2.5 with sodium carbonate solution. A solution of 22.4 g of the coupling component from Example 3b in 200 ml of water adjusted to a pH of 2.0 is added dropwise to the suspension at 0° to 5° C. The mixture is stirred at a pH of 1.5 to 2.5 and 5° C. for 5 hours and then at a pH of 3.5 to 4.0 and 5° C. for 3 hours. During this time, the pH is increased with sodium acetate solution. After coupling is complete, the pH is brought to 6.0 with sodium carbonate solution, and the dyestuff is salted out with 45 g of sodium chloride. After stirring for a further 2 hours, the product is filtered off with suction and dried to give 40 g of a golden yellow dyestuff powder of the structure

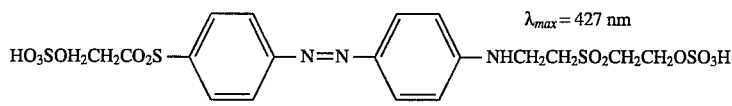

$\lambda_{max}$ = 427 nm

HO$_3$SOH$_2$CH$_2$CO$_2$S—C$_6$H$_4$—N=N—C$_6$H$_4$—NHCH$_2$CH$_2$SO$_2$CH$_2$CH$_2$OSO$_3$H

The same dyestuff can also be prepared by using the coupling or diazo component not in the sulphated form but as the hydroxyethylsulphonyl derivative. Diazotization and coupling are carried out as described above. The intermediate obtained is a dyestuff of the formula

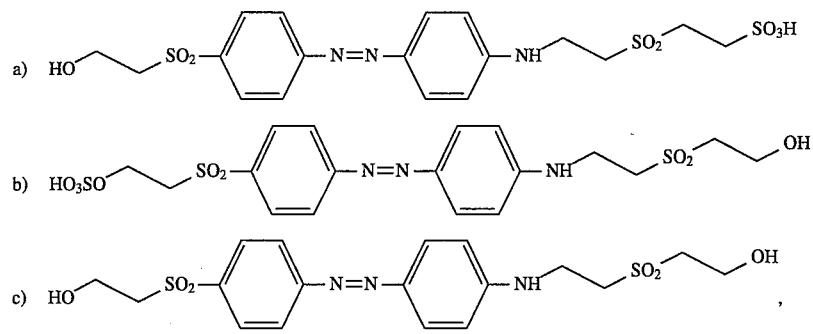

which, after isolation analogously to Example 3a, is subjected to mono- or disulphation.

EXAMPLE 18

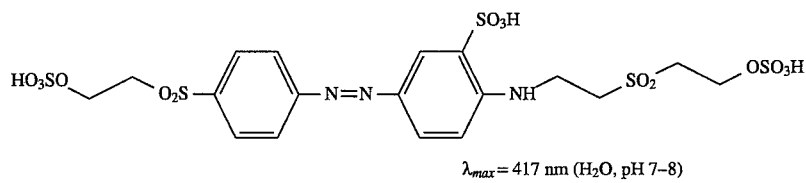

$\lambda_{max}$ = 417 nm (H$_2$O, pH 7–8)

This dyestuff, which has excellent fastness properties, is obtained by subsequent sulphonation of the dyestuff from Example 17 by the method described in Example 4.

Bifunctional reactive dyestuffs which are of similar importance and interest and can be prepared analogously are as follows:

| Ex. | D | L² | L¹ R¹ | R | r |
|---|---|---|---|---|---|
| 19 | —⟨phenyl⟩—SO₂—CH₂CH₂—OSO₃H | H | CH₃ | H | 2 |
| 20 | —⟨phenyl⟩—SO₂—CH₂CH₂—OSO₃H | H | H | H | 3 |
| 21 | —⟨phenyl⟩—SO₂—CH₂CH₂—OSO₃H | SO₃H | H | CH₃ | 2 |
| 22 | —⟨phenyl⟩—SO₂—CH₂CH₂—OSO₃H | H | H | CH₂CH₂SO₂CH₂CH₂OSO₃ | 2 |
| 23 | —⟨phenyl⟩—SO₂—CH₂CH₂—OSO₃H | SO₃H | CH₃ | H | 2 |
| 24 | —⟨phenyl⟩—SO₂—CH₂CH₂—OSO₃H | SO₃H | H | H | 3 |

-continued $$D-N=N-\underset{L^1}{\overset{L^2}{\bigcirc}}-\underset{R}{N}-(CH_2)_r-SO_2\diagup\diagdown OSO_3H$$

| Ex. | D | L² | L¹ | R¹ | R | r |
|---|---|---|---|---|---|---|
| 25 | HO₃SO–CH₂CH₂–SO₂–(naphthyl) | H | H |  | H | 2 |
| 26 | HO₃SO–CH₂CH₂–SO₂–(naphthyl) (λ_max = 421 nm) | SO₃H | H |  | H | 2 |
| 27 | HO₃SO–CH₂CH₂–SO₂–(naphthyl-SO₃H) | H | H |  | H | 2 |
| 28 | HO₃SO–CH₂CH₂–SO₂–(naphthyl-SO₃H) | H | CH₃ |  | H | 2 |
| 29 | HO₃SO–CH₂CH₂–SO₂–(naphthyl-SO₃H) (λ_max = 443 nm) | H | H |  | H | 2 |
| 30 | HO₃SO–CH₂CH₂–SO₂–(naphthyl-SO₃H) (λ_max = 420 nm) | SO₃H | H |  | H | 2 |
| 31 | HO₃SO–CH₂CH₂–SO₂–(naphthyl-SO₃H) | H | H |  | H | 2 |

EXAMPLE 32

4'-Amino-azobenzene-4-sulphonic acid is diazotized in a known manner, and the resulting diazonium salt is coupled onto the component from Example 2b at a pH of 3–5. This solution of the disazo dyestuff of the structure

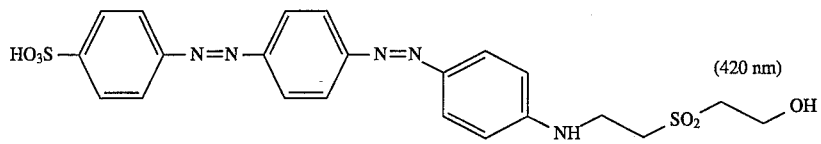
(420 nm)

is isolated by salting out and dried. Sulphation analogously to Example 3a gives a disazo reactive dyestuff which dyes cotton or wool in brilliant orange shades having a high fastness level and has the following structure:

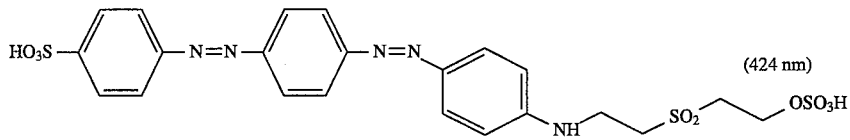
(424 nm)

Further valuable orange or reddish brown disazo reactive dyestuffs of the structure

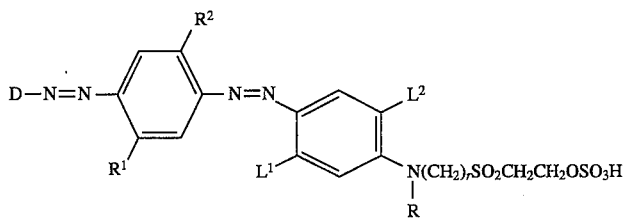

are obtainable by varying the disazo or coupling component (see Table). Fibre-reactive aminoazo compounds used as the diazo component are described, for example, in EP-A-292,825.

| Ex. | D | $L^1$ | $L^2$ | $R^1$ | $R^2$ | R | r |
|---|---|---|---|---|---|---|---|
| 33 | HO$_3$S—⟨ph⟩— | H | H | H | SO$_3$H | H | 2 |
| 34 | HO$_3$S—⟨ph⟩— | CH$_3$ | H | H | H | H | 3 |
| 35 | HO$_3$S—⟨ph⟩— | CH$_3$ | H | H | SO$_3$H | H | 2 |
| 36 | HO$_3$S—⟨ph⟩— | H | H | H | H | CH$_2$CH$_2$SO$_2$CH$_2$CH$_2$SO$_3$H | 2 |
| 37 | HO$_3$S—⟨ph⟩— | H | SO$_3$H | H | H | CH$_3$ | 2 |

-continued

| Ex. | D | L¹ | L² | R¹ | R² | R | r |
|---|---|---|---|---|---|---|---|
| 38 | 4-sulfophenyl | H | H | OCH₃ | OCH₃ | H | 2 |
| 39 | 3-sulfophenyl | H | H | H | OCH₃ | H | 2 |
| 40 | 3-sulfophenyl | H | H | CH₃ | OCH₃ | H | 2 |
| 41 | 4-sulfophenyl | H | SO₃H | H | SO₃H | H | 2 |
| 42 | 4-sulfophenyl | H | H | CH₂SO₂CH₂CH₂OSO₃H | H | H | 2 |
| 43 | 4-sulfophenyl | CH₃ | H | NHCOCH₃ | H | H | 2 |
| 44 | 4-sulfophenyl | H | H | NHCOCH₃ | OCH₃ | H | 2 |
| 45 | 4-sulfophenyl | H | H | NHCONH₂ | H | H | 2 |
| 46 | 1,3-disulfo-7-naphthyl | H | SO₃H | CH₃ | H | CH₂CH₂SO₂CH₂CH₂SO₃H | 2 |
| 47 | 1,3,6-trisulfo-7-naphthyl | H | H | H | H | H | 2 |
| 48 | 1,3-disulfo-7-naphthyl | H | H | NHCOCH₃ | H | H | 2 |
| 49 | 1,3-disulfo-7-naphthyl | H | H | NHCOCH₃ | OCH₃ | CH₂CH₂SO₂CH₂CH₂OSO₃H | 2 |

-continued

| Ex. | D | L¹ | L² | R¹ | R² | R | r |
|---|---|---|---|---|---|---|---|
| 50 | 4-(SO$_2$CH$_2$CH$_2$OSO$_3$H)-2-methylphenyl | CH$_3$ | H | CH$_3$ | SO$_3$H | H | 2 |
| 51 | 4-(SO$_2$CH$_2$CH$_2$OSO$_3$H)-2-methylphenyl | H | H | NHCOCH$_3$ | SO$_3$H | H | 2 |
| 52 | 3-(SO$_2$CH$_2$CH$_2$OSO$_3$H)-2-methylphenyl | H | H | H | SO$_3$H | H | 2 |
| 53 | 4-(CH$_2$SO$_2$CH$_2$CH$_2$OSO$_3$H)-2-methylphenyl | H | H | CH$_3$ | SO$_3$H | H | 2 |
| 54 | 1-SO$_3$H, 3-SO$_2$CH$_2$CH$_2$OSO$_3$H, 7-methyl naphthyl | H | H | CH$_3$ | SO$_3$H | H | 2 |
| 55 | 1-SO$_3$H, 3-SO$_2$CH$_2$CH$_2$OSO$_3$H, 7-methyl naphthyl | H | H | H | SO$_3$H | H | 2 |

By varying the middle component, further valuable disazo reactive components are obtainable, such as, for example,

EXAMPLE 56

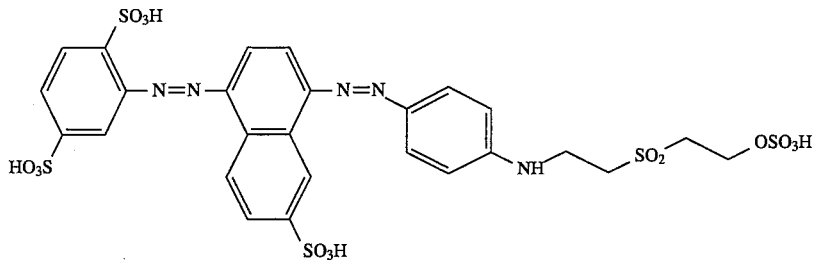

EXAMPLE 57

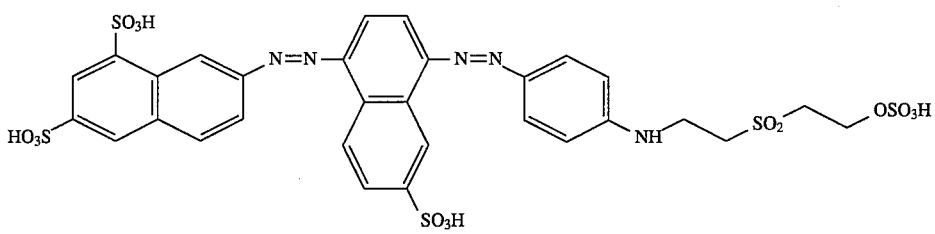

EXAMPLE 58

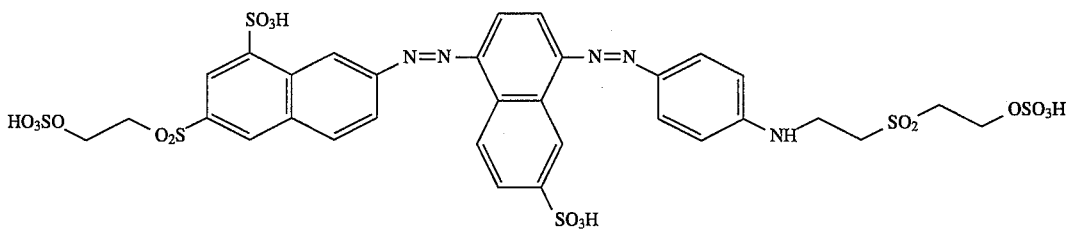

EXAMPLE 59

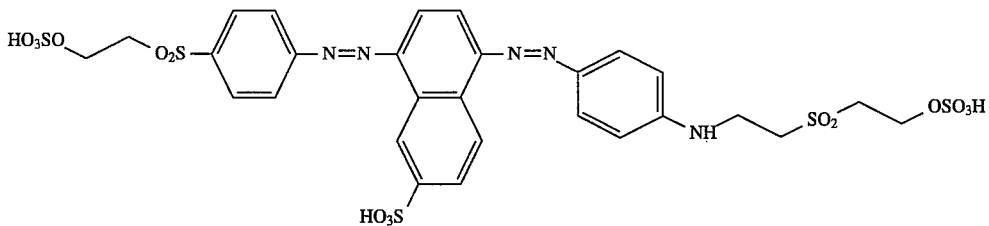

EXAMPLE 60

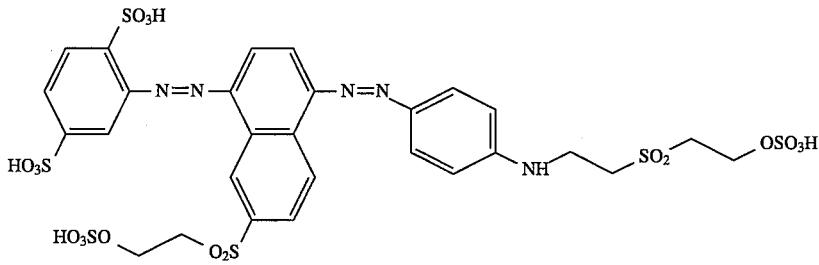

EXAMPLE 61

The dyestuff base of the structure

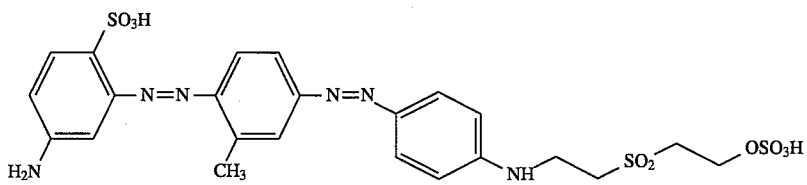

which can be prepared by diazotizing 5-acetylamino-2-aminobenzenesulphonic acid, coupling the resulting diazonium salt onto m-toluidine, diazotizing the aminoazo compound, coupling the resulting diazonium salt onto the component from Example 2b, hydrolysis of the N-acetyl grouping, and sulphation of the hydroxyethyl groupings is stirred in water at a pH of 6.5 and reacted with a 1.2-fold equimolar excess of 5-chloro-2,4,6-trifluoropyrimidine. The pH is kept constant at 6–7 during the reaction by addition of sodium carbonate solution. After the end of the reaction, the solid of the structure

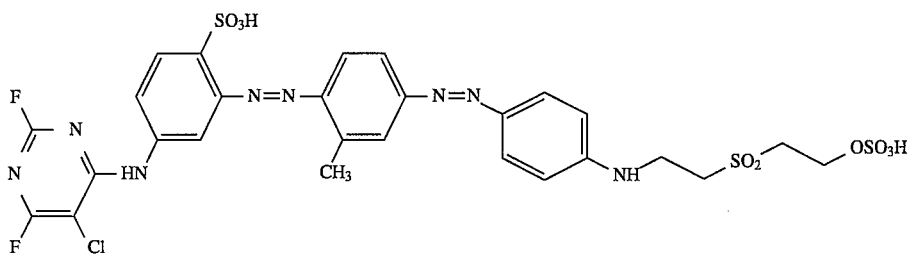

is salted out, isolated by suction filtration and dried. It dyes cotton in reddish yellow shades. Further interesting bifunctional reactive dyestuffs are obtainable by repeating this process variant.

EXAMPLE 62

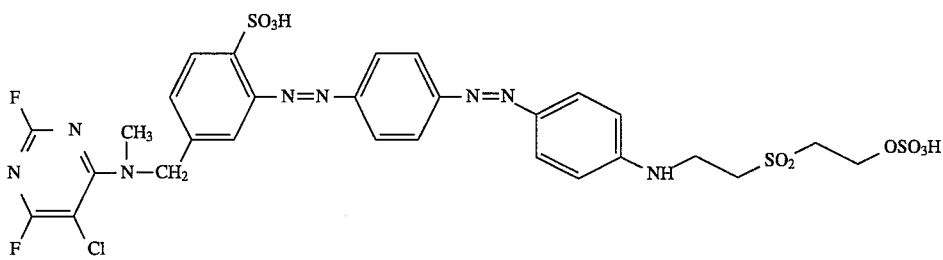

EXAMPLE 63

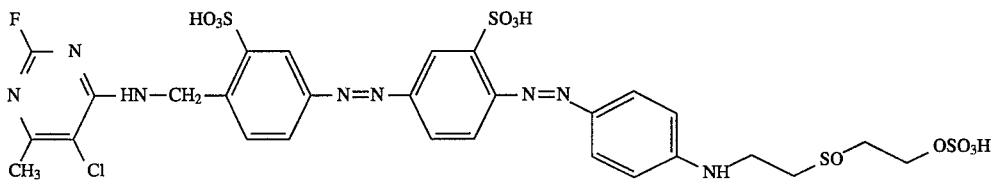

EXAMPLE 64

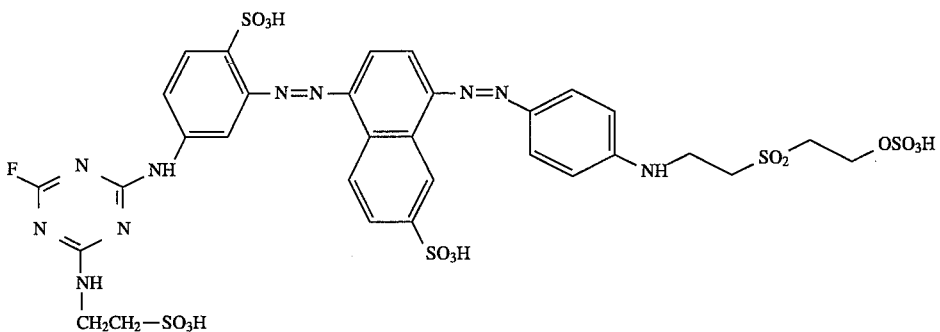

EXAMPLE 65

2-Amino-5-aminomethyl-1-naphthalenesulphonic acid is diazotized in the usual manner, and the resulting diazonium salt is coupled onto the coupling component from Example 2b. After sulphation of the monoazo compound, the product is condensed with an equimolar amount of 5-chloro-4,6-difluoropyrimidine at a pH of 7–8. The hydrofluoric acid released is continuously neutralized by addition of sodium carbonate. The dyestuff is salted out, filtered off with suction and dried. It dyes cotton in clear yellow shades and has the structure

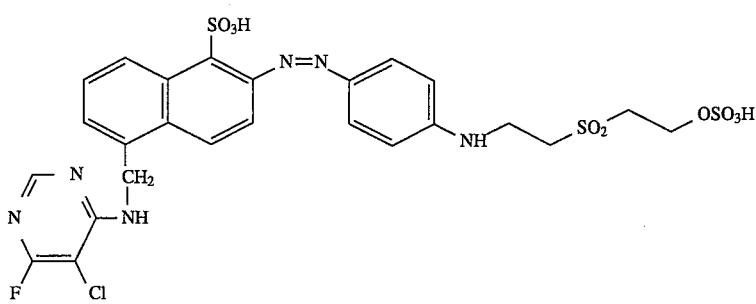

EXAMPLE 66

54 g of 2,2'-(1,2-ethanediyl)bis[5-aminobenzenesulphonic acid] are stirred in 300 ml of water, 100 g of ice and 60 ml of conc. hydrochloric acid and then tetrazotized by addition of 70 ml of a 30% strength by volume aqueous sodium nitrite solution. The suspension is stirred at 5° C. for 1 hour. The excess nitrite is removed after the end of the reaction by addition of sulphamic acid. A solution of 57.2 g of the compound of the formula

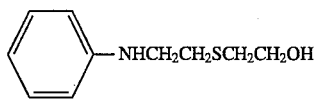

in 400 g of ice, 400 g of water and 15 ml of conc. hydrochloric acid is then added. After 30 minutes, the pH is brought, at about 10° C. to 3 0 to 3.5 with sodium carbonate solution over a period of one hour, and the resulting mixture is stirred for four hours. The precipitated intermediate of the structure

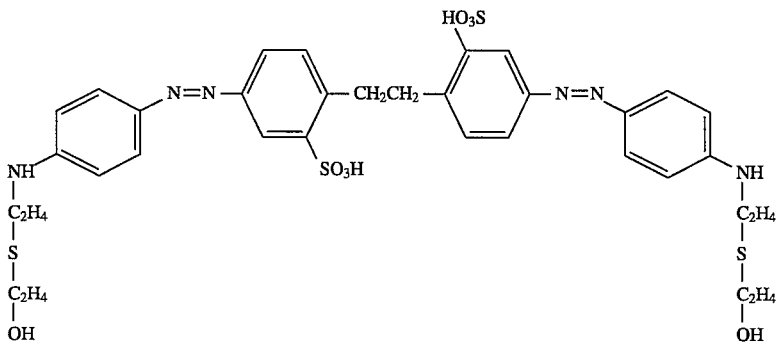

($\lambda_{max}$=412 nm) is isolated by suction filtration, and the moist paste is directly further reacted. However, isolation of the intermediate can also be omitted, and the coupling mixture can be oxidized directly.

For oxidation, the moist paste is suspended in 400 ml of water, the suspension is brought to a pH of 8.5 with sodium carbonate solution, and 0.2 g of sodium tungstate is added. The mixture is heated to 60° C. Without any further addition of heat, about 100 ml of a 30% strength aqueous hydrogen peroxide solution are then slowly metered in, the heat of reaction causing the temperature to rise to about 70° to 75° C., and a solution being formed. After one hour of additional stirring at 75° C., the mixture is cooled to 20° C., and the precipitated dyestuff is salted out, isolated and dried to give about 90 g of the salt-containing product of the structure

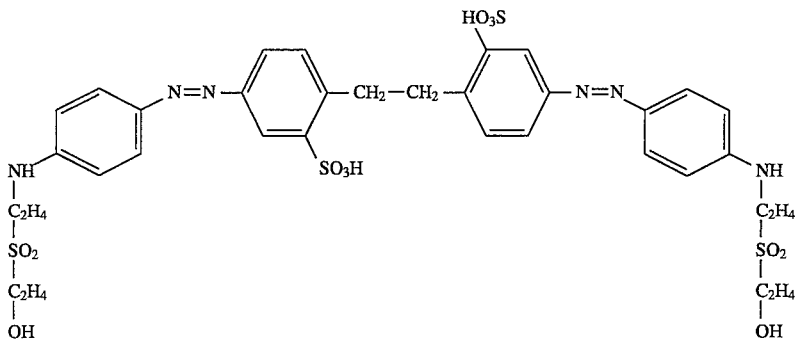

($\lambda_{max}$=382, 440 (sh) nm)

This amount is introduced in portions into 250 ml of sulphuric acid monohydrate at 20°–25° C. and stirred for about 3 hours until a solution is formed. Upon pouring the mixture onto 200 ml of water/400 g of ice, the dyestuff precipitates in crystalline form. 20 g of solid sodium bicarbonate are introduced in portions, and the solid product is then filtered off with suction. The isolated material is stirred in 200 ml of water and neutralized with sodium carbonate solution. Spray-drying of this mixture gives about 150 g of salt-containing reactive dyestuff which has the structure

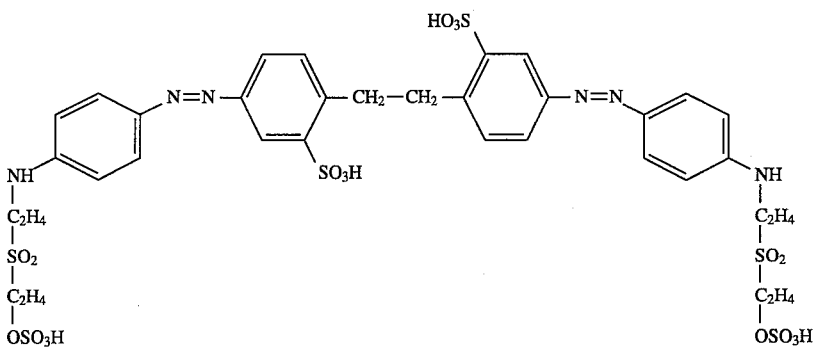

and dyes cotton in yellow hues ($\lambda_{max}$=382, 440 (sh) nm).

Further interesting and important disazo dyestuffs or trisazo dyestuffs are obtained by varying the tetrazo component in Example 66:

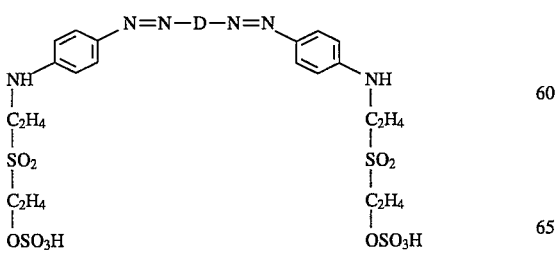

EXAMPLE 67

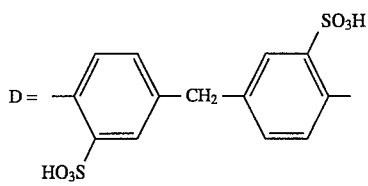

EXAMPLE 68

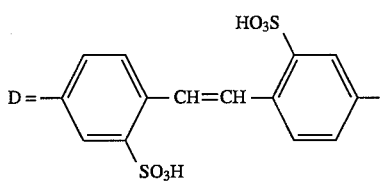

EXAMPLE 69

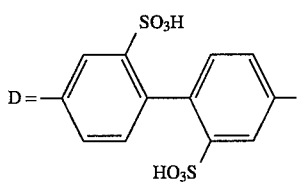

EXAMPLE 70

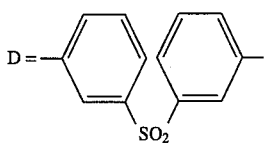

EXAMPLE 71

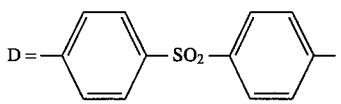

EXAMPLE 72

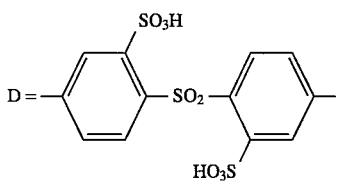

EXAMPLE 73

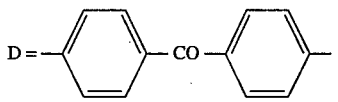

EXAMPLE 74

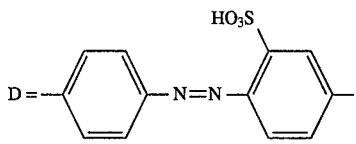

EXAMPLE 75

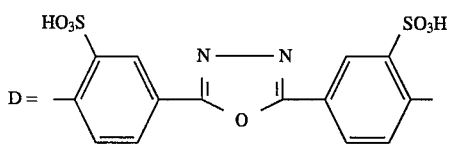

EXAMPLE 76

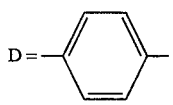

EXAMPLE 77

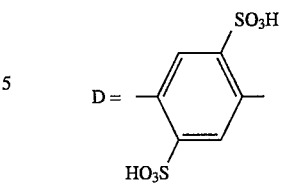

EXAMPLE 78

31.6 g of 2-Amino-5-nitrobenzenesulphonic acid are dissolved in 250 ml of water and 40 ml of conc. hydrochloric acid at 70° C. The mixture is cooled to 15° C. by throwing in ice and diazotized with 35 ml of 30% strength by volume aqueous sodium nitrite solution. After an additional stirring time of 30 minutes at 15° C. the excess nitrite is removed with sulphamic acid. 33.2 g of the coupling component from Experiment 2b are added, and the pH of the mixture is slowly brought to 4.5 over a period of 3 hours. The product is salted out with 30 g of sodium chloride. After cooling, the precipitated intermediate of the structure

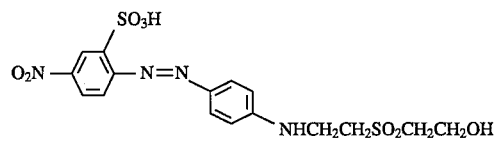

is isolated by suction filtration.

These 130 g of moist nitroazo compound are heated to 80° C. in 300 ml of water and at pH 7. This is followed by metering in 50 ml of an approximately 30% strength aqueous sodium hydrogen sulphide solution over a period of 20 minutes and stirring of the mixture at 80° C. for 2 hours. The end of the reduction is checked by thin-layer chromatography. 5 g of activated carbon are then added, and the hot solution is clarified After cooling to 20° C., the mixture is brought to a pH of 5.0, and the product is salted out with 40 g of potassium chloride. It is filtered off with suction and dried to give 70 g of the salt-containing aminoazo intermediate of the structure

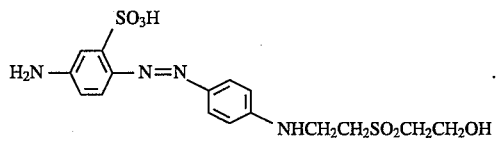

EXAMPLE 79

70 g of the intermediate from Example 78 are stirred in 400 ml of water, 100 g of ice and 40 ml of conc. hydrochloric acid and diazotized at 5° to 15° C. by metered addition of about 25 ml of 30% strength by volume sodium nitrite solution. After an additional stirring phase of two hours, 27 g of the coupling component from Example 2b are added, and the pH is slowly increased to 5.0 with sodium carbonate solution over a period of 3 hours (temperature: about 20° C.). Isolation and drying give about 75 g of the reactive dyestuff precursor of the structure

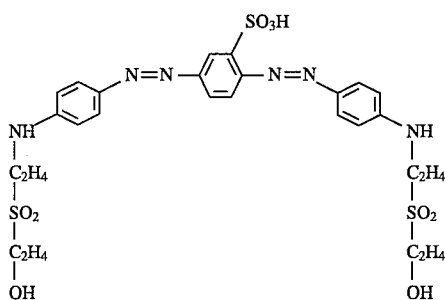

EXAMPLE 80

This precursor from Example 79 is also obtained by acid hydrolysis of the intermediate of the structure

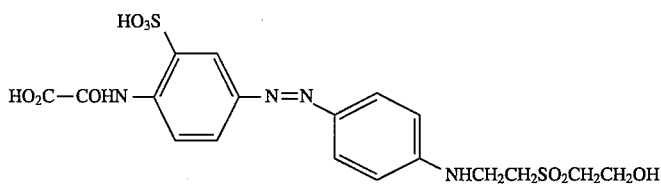

obtained by diazotizing N-(4-amino-2-sulphophenyl)oxamic acid and coupling the resulting diazonium salt onto the coupling component from Example 2b, diazotization of the resulting amino compound, and coupling of the resulting diazonium salt onto the coupling component from Example 2b.

EXAMPLE 81

75 g of the disazodisulphone from Example 79 are introduced in portions into 200 ml of sulphuric acid monohydrate at 20° to 25° C. and the mixture is stirred at 25° to 30° C. until a solution is formed. Upon pouring the mixture onto 200 ml of water/400 g of ice, the dyestuff already precipitates partly in crystalline form. A more complete precipitation is obtained after metered addition of 30 to 40 g of solid sodium carbonate. The product is filtered off with suction, and the isolated paste is stirred in 250 ml of water. After neutralization to a pH of 6.0 with sodium carbonate solution, the mixture is spray-dried or concentrated to dryness on a rotary evaporator. This gives about 130 g of the salt-containing reactive dyestuff of the structure

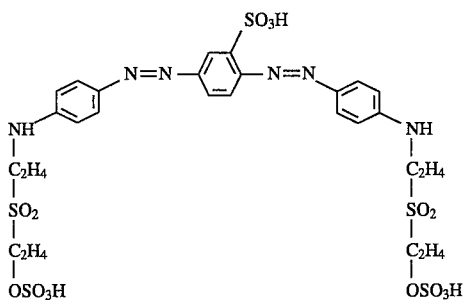

which dyes cotton in clear golden yellow shades.

Another variation of the preparation of Example 81 is the reaction of the disazodisulphone from Example 79 with oleum in a laboratory kneader. This is effected by metering in the reaction mixture at about 70° to 80° C./180 mbar and then increasing the temperature to about 140° C./2 mbar. The mixture is concentrated to dryness to give about 115 g of dyestuff powder.

EXAMPLE 82

Example 78, 79 or 81 is repeated, using 2-amino-6-nitro-4,8-naphthalenedisulphonic acid instead of 2-amino-5-nitrobenzenesulphonic acid as the starting component in Example 78, to give a golden yellow reactive dyestuff of the structure

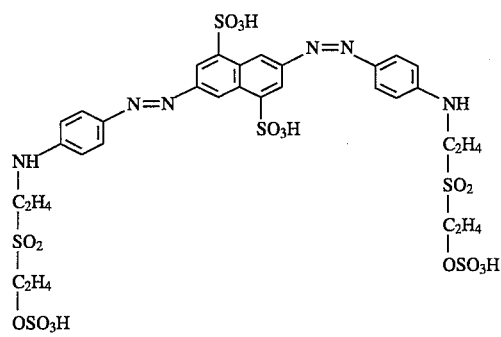

EXAMPLE 83

70 g of the aminoazo intermediate from Example 78 are introduced into 200 ml of sulphuric acid at 20° to 25° C., and the mixture is stirred at 30° C. for 2 hours. The solution is carefully poured onto a mixture of 200 ml of water/400 g of ice. In order to precipitate the disodium salt, 20 g of solid sodium carbonate are added in portions, and, if necessary, the product is salted out with various amounts of sodium chloride. The orange-yellow precipitate is isolated and dissolved in 300 ml of water at a pH of 6.0. The fibre-reactive intermediate of the structure

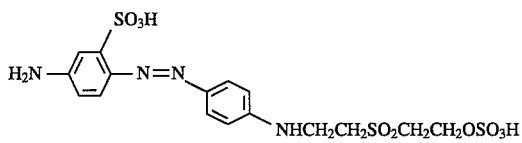

is most advantageously further reacted in solution.

EXAMPLE 84

At 30° C. and a pH of 6 to 6.5, phosgene is introduced into the solution of the intermediate from Example 82 under appropriate safety precautions until free dyestuff base can no longer be detected.

The pH is kept constant by uniform addition of sodium carbonate solution. After the end of the reaction, stirring is continued at 40° C. for 2 hours (pH 6.0) in order to destroy residual phosgene. The mixture is cooled to 20° C., and the product is salted out with 30 g of sodium chloride. Isolation and drying give about 125 g of an orange-yellow salt-containing dyestuff powder which has the structure

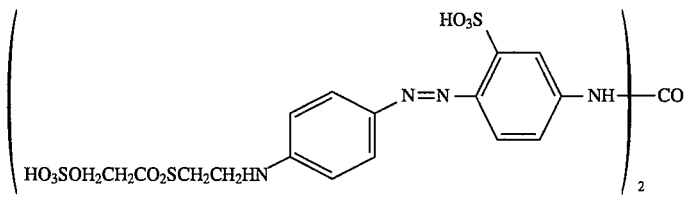

and dyes cotton in yellow hues.

EXAMPLE 85

The solution from Example 82 is reacted with 13 g of cyanuric chloride at 10° to 15° C. and a constant pH of 6.0 to 6.5. The pH is controlled by sodium carbonate solution. After about 2 hours, the reaction is complete. Stirring at 30° C. is continued for another hour, the solution is clarified by means of a filter aid, and the dyestuff is salted out by addition of sufficient amounts of sodium chloride. Isolation gives about 135 g of salt-containing reactive dyestuff which has the structure

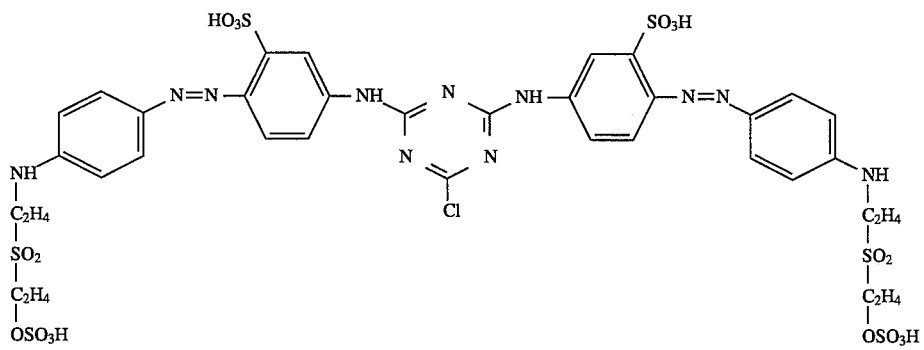

and dyes cotton in yellow hues.

If cyanuric chloride in Example 85 is replaced by equimolar amounts of cyanuric fluoride, 2-(2-sulphoethyl)amino-4,6-dichlorotriazine, 2-(3-sulphophenyl)amino-4,6-difluorotriazine or other comparable dihalogenotriazine derivatives, the following interesting yellow dyestuffs are obtained:

EXAMPLE 86

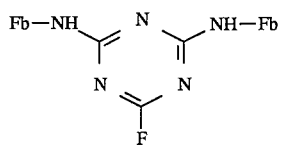

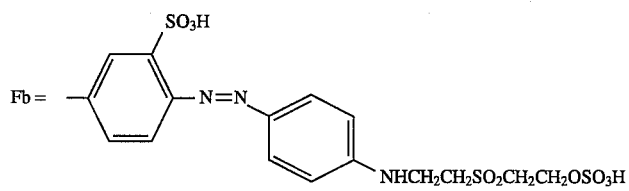

EXAMPLE 87
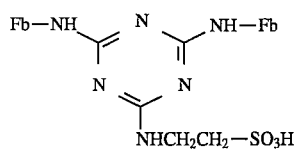
EXAMPLE 88
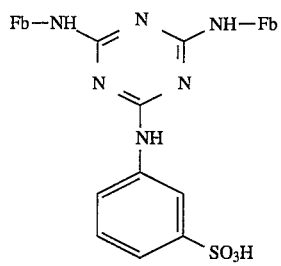
EXAMPLE 89
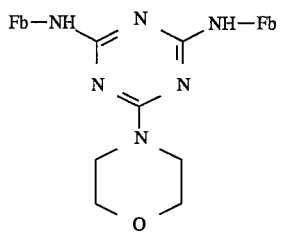
EXAMPLE 90
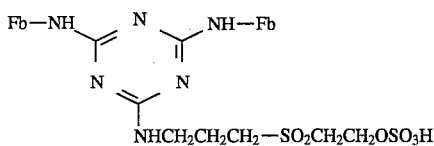
EXAMPLE 91
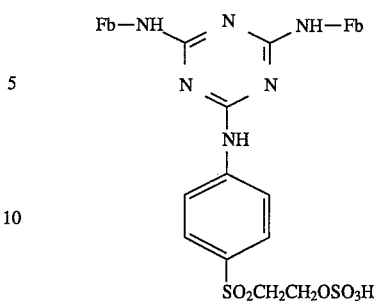
The following, likewise important reactive dyestuff examples $Fb(C_2H_4-SO_2-C_2H_4-OSO_3H)_2$ are available analogously by varying the coupling component in the preceding examples:
EXAMPLE 92
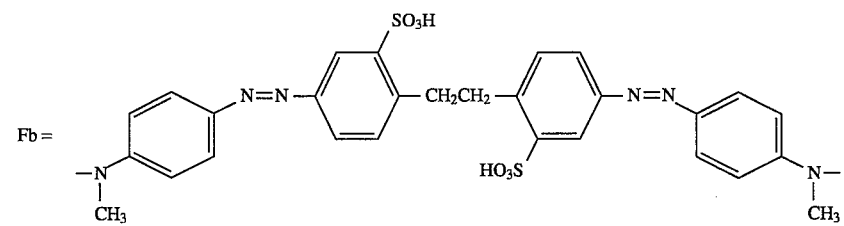
EXAMPLE 93
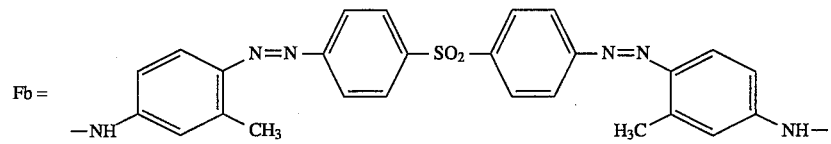

EXAMPLE 94

Fb = 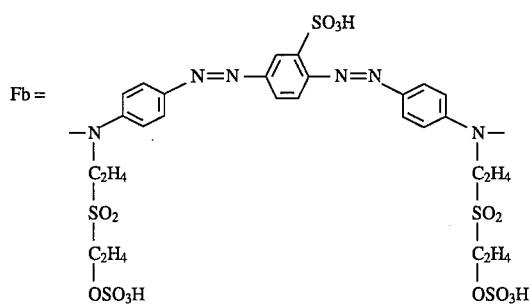

EXAMPLE 95

Fb = 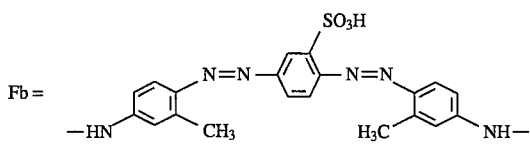

EXAMPLE 96

Fb = 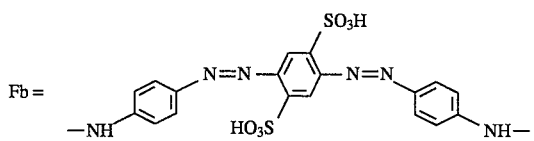

EXAMPLE 97

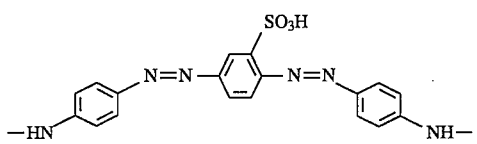

EXAMPLE 98

The azo dyestuff from Example 78 is dissolved as a moist paste in 500 ml of water at 60° C. The pH is brought to 12.0 with about 35 ml of conc. sodium hydroxide solution, and 20 g of glucose are then added. The reduction reaction is slightly exothermic. Stirring at 65°–70° C. is continued for one hour, the mixture is then cooled to 20° C. the pH is brought to 6 0, and the product is isolated by suction filtration and dried to give about 60 g of salt-containing product which has the structure ($\lambda_{max}$=451 nm, H$_2$O)

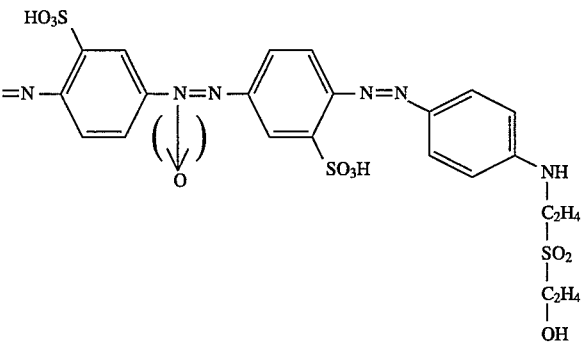

35 g of this non-fibre-reactive dyestuff are introduced in portions into 100 ml of sulphuric acid monohydrate at 15°–25° C., and the mixture is stirred until a solution is obtained. 20 ml of 20% strength oleum are added to this solution at 25°–30° C., and stirring is continued for one hour. This solution is then poured onto a mixture of 100 ml of saturated sodium chloride solution and 300 g of ice. The precipitated dyestuff is filtered off with suction. The isolated acid paste is stirred into 100 ml of water and brought to a pH of 5.5 with solid sodium bicarbonate. The dyestuff solution is completely concentrated on a rotary evaporator, and the resulting, still moist dyestuff is dried to give about 55 g of sodium sulphate-containing reactive dyestuff of the structure ($\lambda_{max}$=454 nm (H$_2$O)),

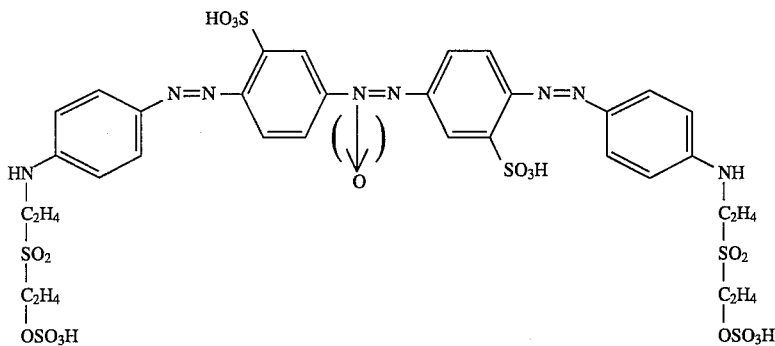
which dyes cotton in reddish brown shades.
The dyestuff examples below can also be obtained analogously to the preparation procedure of Example 98 by varying the diazo or coupling component:
Fb(—$C_2H_4$—$SO_2$—$C_2H_4$—$OSO_3H$)$_2$ or
Fb(—$C_2H_4$—$SO_2$—$C_2H_4$—$OSO_3H$)$_4$ (see Example 101).
EXAMLE 99
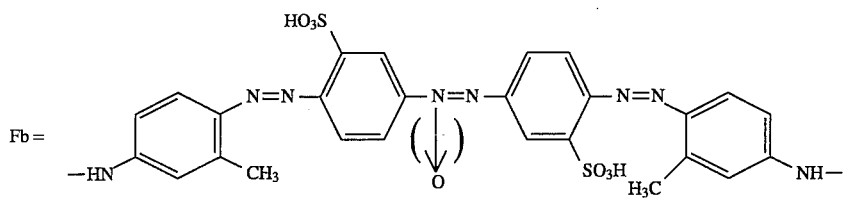
EXAMPLE 100
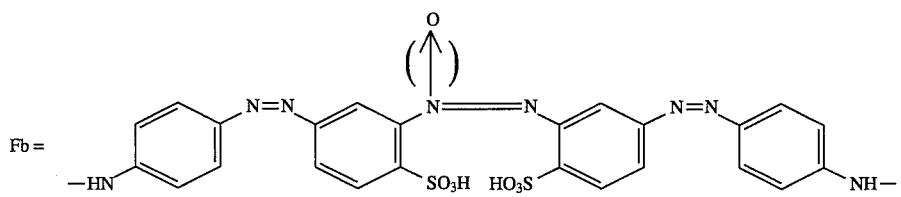
EXAMPLE 101
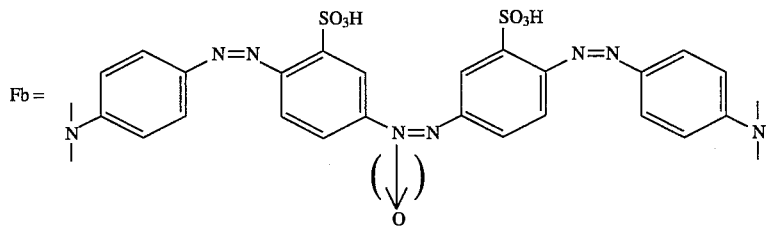
EXAMPLE 102

Fb = 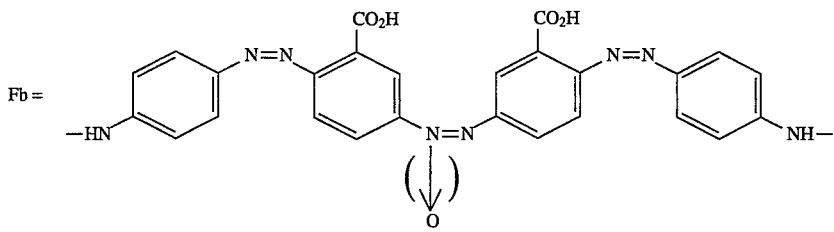
Further valuable dyestuffs are obtained by sulphonating the dyestuffs described in Examples 66 to 91 or the coupled precursors thereof analogously to the procedures in Example 4.
Selected examples are:
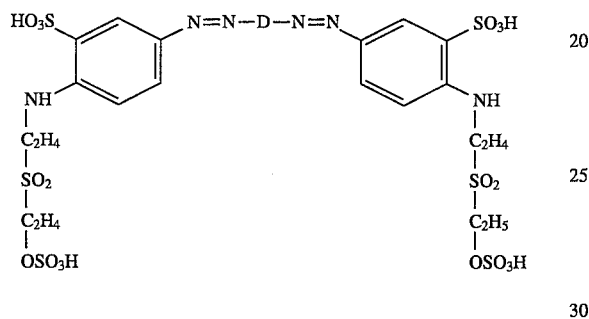
EXAMPLE 103
EXAMPLE 104
EXAMPLE 105
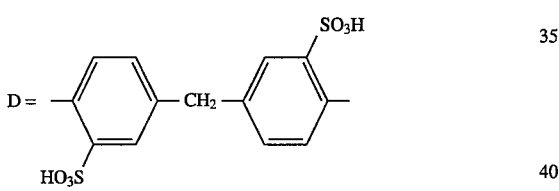
EXAMPLE 106
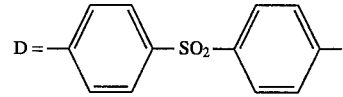
EXAMPLE 107
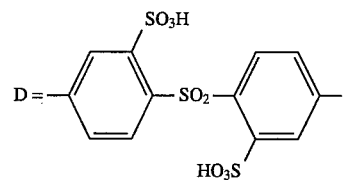
EXAMPLE 108
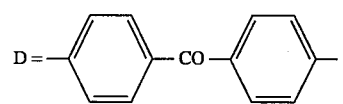
EXAMPLE 109
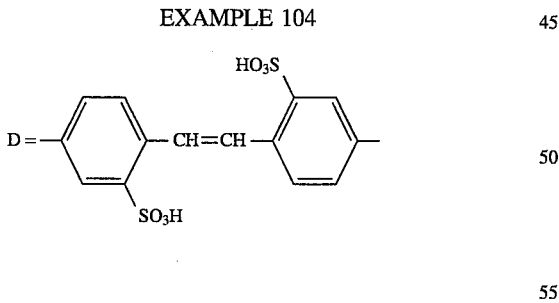
EXAMPLE 110
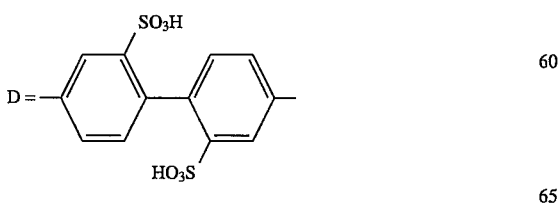
EXAMPLE 111
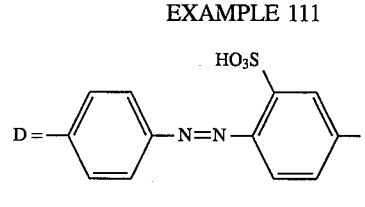

EXAMPLE 112
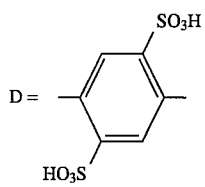
EXAMPLE 113
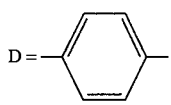
EXAMPLE 114
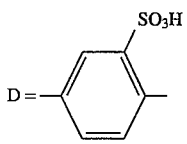
EXAMPLE 115
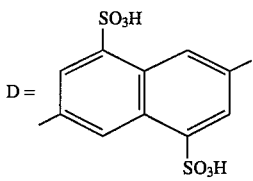
EXAMPLE 116
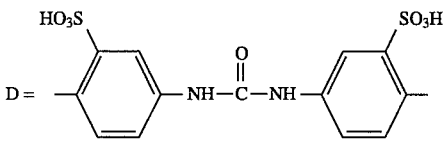
EXAMPLE 117
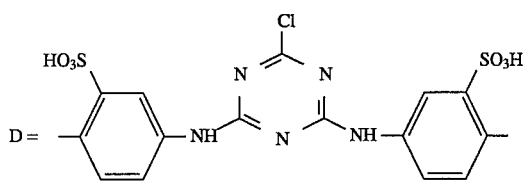
EXAMPLE 118
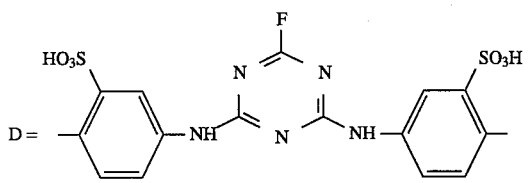
EXAMPLE 119
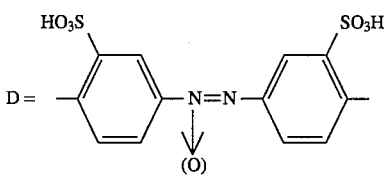
EXAMPLE 120
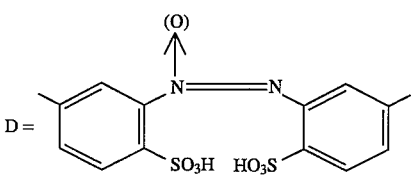
EXAMPLE 121
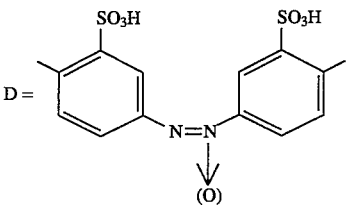
EXAMPLE 122
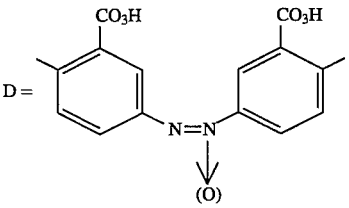
Dyestuffs which are also of interest
Fb $-(C_2H_4-SO_2-C_2H_4-OSO_3H)_2$ or
Fb $-(C_2H_4-SO_2-C_2H_4-OSO_3H)_4$ (see Example 125) are obtained by using substituted derivatives of the coupling components described in Examples 1 to 3 analogously to the above examples.
EXAMPLE 123

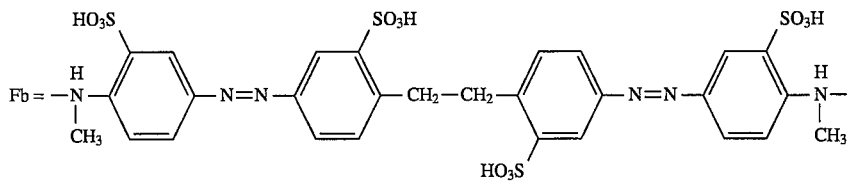

EXAMPLE 124

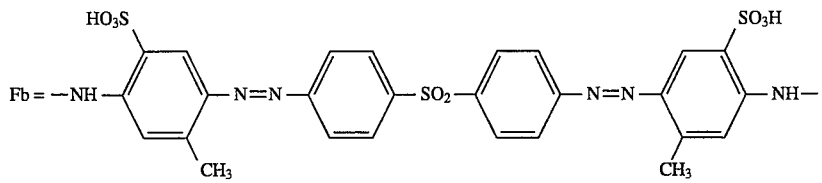

EXAMPLE 125

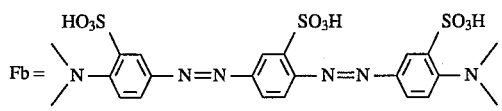

EXAMPLE 126

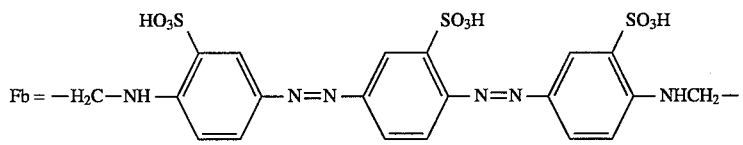

Dyeing Procedure 1

2 parts of the dyestuff obtainable according to Example 32 are dissolved in 100 ml of water. The solution is added to 1900 parts of cold water, 60 parts of sodium chloride are added, and this dyebath is entered with 100 parts of a cotton fabric.

The temperature is increased to 50° C. 40 parts of calcined sodium carbonate and another 60 parts of sodium chloride being added after 30minutes. The temperature is maintained at 50° C. for 30 minutes, the dyeing is rinsed and soaped in a 0.3% strength boiling solution of non-ionic detergent for 15 minutes, rinsed and dried to give a golden yellow dyeing having good fastness properties.

Dyeing Procedure 2

4 parts of the reactive dyestuff prepared in Example 66 are dissolved in 50 parts of water. 50 parts of a solution containing 5 g of sodium hydroxide and 10 g of calcined sodium carbonate per liter are added to this solution. The solution obtained is used to pad a cotton fabric in such a manner that its liquor pickup is 70%. The cotton fabric is then wound onto a batching roller and left there at room temperature for 3 to 12 hours. The dyed goods are then rinsed, soaped at the boil with a non-ionic detergent for a quarter of an hour, rinsed again and dried to give a yellow dyeing having good fastness properties.

Deep black dyeings are obtained by using suitable mixtures of dyestuff Example 32 with the dyestuff of the formula

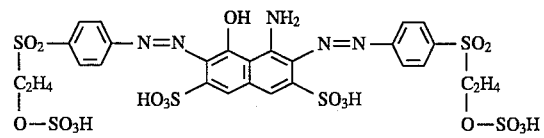

or a salt thereof.

Green dyeings are obtained by using suitable mixtures of dyestuff Example 66 with the dyestuff of the formula

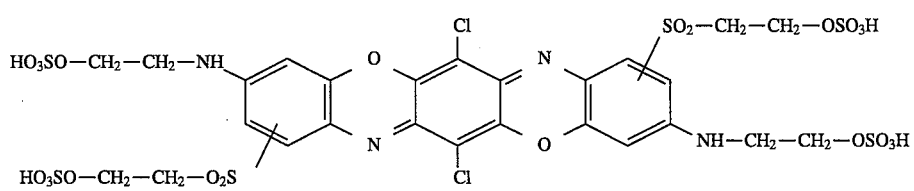

or a salt thereof.

We claim:

1. Reactive dyestuff of the structure (1)

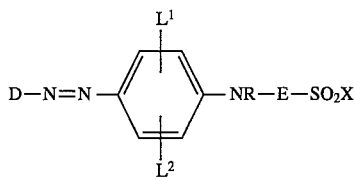
(1)

in which

D denotes the radical of a diazo component

X together with the $SO_2$ group denotes the radical of a fibre-reactive group $L^1$ denotes H, $C_1$-$C_4$-alkyl, $C_1$-$C_4$-alkoxy, $CO_2H$, $NHCO$-$C_1$-$C_4$-alkyl, $NHCONH_2$ or halogen, $L^2$ denotes H, $SO_3H$, $C_1$-$C_4$-alkyl or $C_1$-$C_4$-alkoxy, R denotes H, $CH_2CH_2OH$, $CH_2CH_2OSO_3H$ or $-E-SO_2X$, E denotes $-(CH_2-CH_2-O)_i-(CH_2)_r-$, i being 0 or 1 and r being 2 or 3, the dyestuff containing at least one water-solubilizing group and at least one sulfo or carboxyl group.

2. Dyestuff according to claim 1, characterized in that

D denotes the radical of a diazo component from the benzene, naphthalene or azobenzene series or a radical of the formula

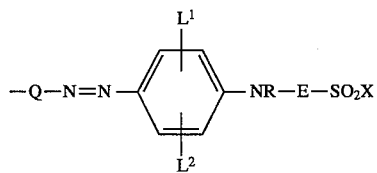

in which

Q is a bivalent aromatic or heteroaromatic radical, and the remaining groups, independently of one another, have the meaning given in claim 1.

3. Reactive dyestuff according to claim 1, characterized in that

X denotes $CH=CH_2$ or $CH_2CH_2OSO_3H$, $CH_2CH_2-S_2O_3H$, $CH_2CH_2OCOCH_3$, $CH_2-CH_2-OPO_3H_2-$ or $CH_2CH_2Cl$.

4. Reactive dyestuff according to claim 1, characterized in that

Q is a bivalent aromatic or heterocyclic radical of the structure

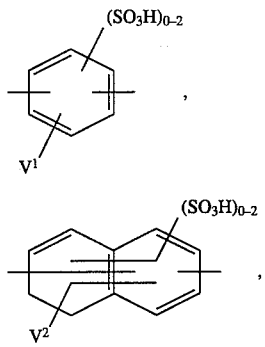

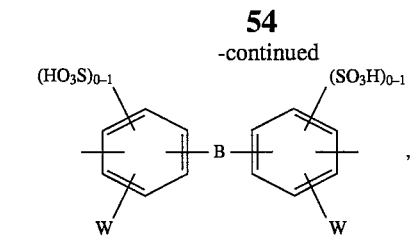

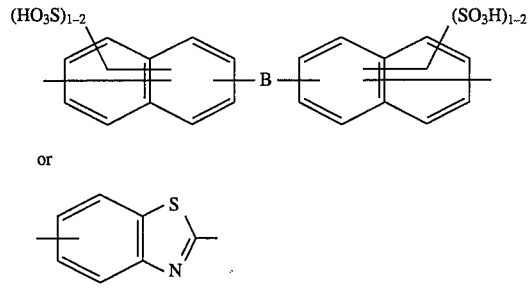

or

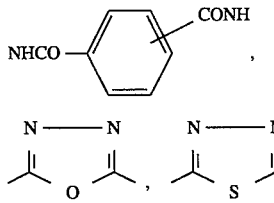

where $V^1$, $V^2$, W independently of one another, are hydrogen or a substituent typical of carbocycles, B is a direct bond or a bridging member.

5. Reactive dyestuff according to claim 4, in which

B is a direct bond or a bridging member of the formula $CH_2$, $CH_2-CH_2$, $CH=CH$, $C\equiv C$, O, S, SO, $SO_2$, CO, $CO_2$, $OCH_2CH_2O$, $CH_2-O-CH_2$, $CH_2CH_2OCH_2CH_2$, NHCO, NHCONH, $NR^1$, N=N, N=N-O, O-N=N-O, NHCOCONH,

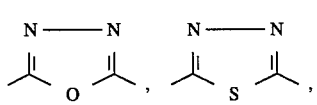

or a triazinyl radical of the structure

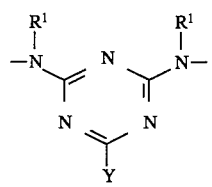

in which each $R^1$ independently of the other, is H or $C_1$-$C_4$-alkyl and

Y is F, Cl, Br, $OR^2$, $SR^2$, $NR^3R^4$, $R^2$ is H, $C_1$-$C_6$-alkyl, OH—, halogen-, $C_1$-$C_4$-alkoxy-, $CO_2H$—, $SO_3H$— or $OSO_3H$-substituted $C_1$-$C_6$-alkyl, cyclohexyl, furfuryl, phenyl, OH—, $CO_2H$—, $SO_3H$—, $C_1$-$C_4$-alkyl- or $C_1$-$C_4$-alkoxy-substituted phenyl or OH—, $CO_2H$— or $SO_3H$-substituted or unsubstituted naphthyl, $R^3$, $R^4$ independently of one another, are hydrogen, $C_1$-$C_6$-alkyl, $C_1$-$C_4$-alkenyl, halogen-, OH—, $CO_2H$—, $SO_3H$—, $OSO_3H$—, methoxy-, ethoxy-, $SO_2X$— or $OCH_2CH_2SO_2X$-substituted $C_1$-$C_6$-alkyl, cyclohexyl, cyclopentyl, benzyl, phenyl or naphthyl, or are $C_1$-$C_4$-alkyl-, $C_1$-$C_4$-alkoxy-, halogen-, $CO_2H$—, $SO_3H$—, $SO_2X$— or $CH_2SO_2X$-substituted phenyl, benzyl or naphthyl, or $R^3$ and $R^4$ together with the N atom form the radical of a 5- or 6-membered heterocycle.

6. Reactive dyestuff according to claim 1 in which

L² is H or SO₃H

X is CH=CH₂ or CH₂CH₂OSO₃H,

R is H or (CH₂)₂₋₃—SO₂X.

7. Reactive dyestuff according to claim 1, having one of the following formulae

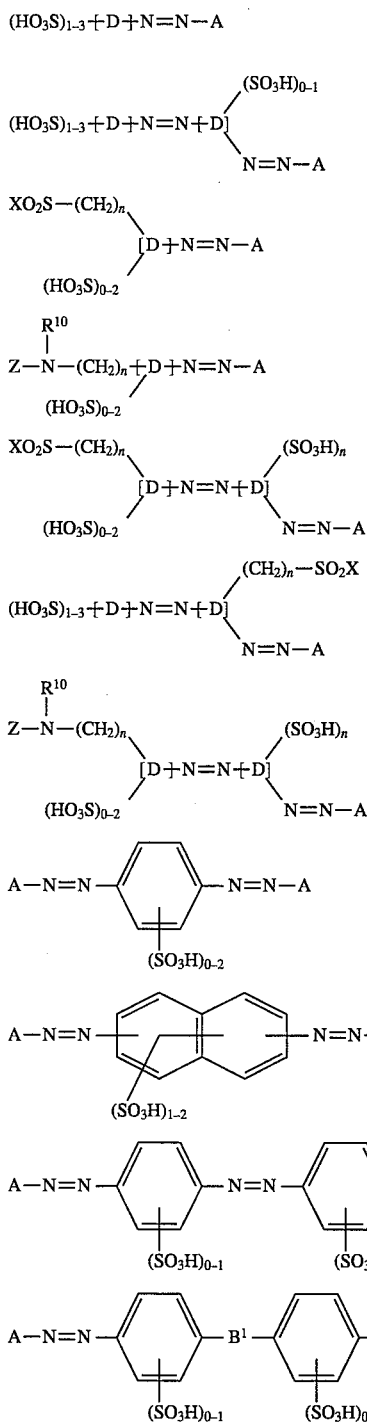

in which:

A denotes

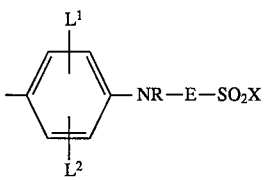

n denotes 0 or 1

$R^{10}$ denotes H or $C_1$–$C_4$-alkyl,

Z denotes a fibre-reactive halogen-containing radical from the triazine or pyrimidine series, and D denotes phenylene or a naphthylene radical which may additionally be substituted by carboxyl, methyl, ethyl, methoxy, ethoxy, chlorine, bromine or fluorine, it being possible for the two groups D in formula (7), (8) and (9) to have the same or different meanings, and $B^1$ denotes a direct bond or CH₂CH₂, CH=CH, CO, SO₂, NHCONH or a triazinyl radical of the structure

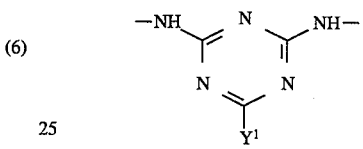

in which $Y^1$ is Cl, F, OH or $NR^3R^4$, $R^3$, $R^4$ independently of one another, denote hydrogen, $C_1$–$C_6$-alkyl, $C_1$–$C_4$-alkenyl, halogen-, OH—, CO₂H—, SO₃H—, OSO₃H—, methoxy-, ethoxy-, SO₂X— or OCH₂CH$_{SO_2}$X-substituted $C_1$–$C_6$-alkyl, cyclohexyl, cyclopentyl, benzyl, phenyl or naphthyl, or $C_1$–$C_4$-alkyl-, $C_1$–$C_4$-alkoxy-, halogen-, CO₂H—, SO₃H—, SO₂X— or CH₂SO₂X-substituted phenyl, benzyl or naphthyl, it being possible for $R^3$ and $R^4$ together with the N atom to form the radical of a 5- or 6-membered heterocycle.

8. A reactive dyestuff according to claim 5, wherein the radical of the 5- or 6-membered heterocycle is

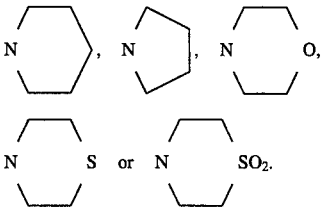

9. A reactive dyestuff according to claim 1, which has the formula

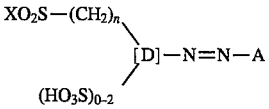

wherein A is

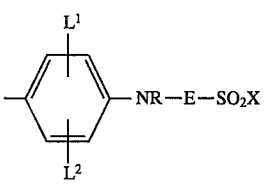

and

D is benzene

L$^1$ is H, $C_1$-$C_4$-alkyl, $C_1$-$C_4$-alkoxy, $CO_2H$, NHCO—$C_1$-$C_4$-alkyl, $NHCONH_2$ or halogen, L$_2$ is H, $SO_3H$, $C_1$-$C_4$-alkyl or $C_1$-$C_4$-alkoxy, R is H or —E—$SO_2X$, E is —($CH_2$—$CH_2$—O)$_i$—($CH_2$)$_r$—, i being 0 or 1 and r being 2 or 3, and X is $CH=CH_2$, $CH_2CH_2OSO_3H$, $CH_2CH_2$—$S_2O_3H$, $CH_2CH_2OCOCH_3$, $CH_2$—$CH_2$—$OPO_3H_2$ or $CH_2CH_2Cl$.

10. A reactive dyestuff according to claim 1, which has the formula

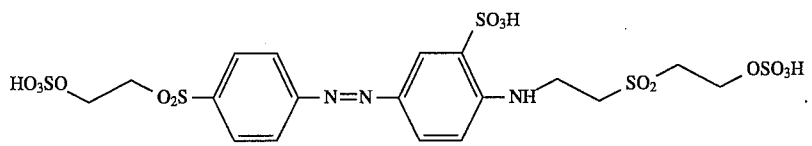

11. Process for dyeing and printing hydroxyl- and amido-containing materials with a reactive dyestuff, comprising applying thereto at least one reactive dyestuff according to claim 1.

12. Fibre-containing textiles, dyed with a reactive dyestuff according to claim 1.

* * * * *

UNITED STATES PATENT AND TRADEMARK OFFICE
CERTIFICATE OF CORRECTION

PATENT NO. : 5,493,010
DATED : February 20, 1996
INVENTOR(S) : Herd, et al.

It is certified that error appears in the above-indentified patent and that said Letters Patent is hereby corrected as shown below:

| | |
|---|---|
| Title Page & Col. 1 line 1 | Title [54]: Delete " $SO_2$ " and substitute -- $SO_2X$ -- |
| Col. 53, line 17 | Delete " $CH_2CH_2OH$, $CH_2CH_2OSO_3H$ " |
| Col. 56, line 8 | Delete " $OCH_2CH_{SO_2}X$ " and substitute -- $OCH_2CH_2SO_2X$ -- |

Signed and Sealed this

Second Day of December, 1997

Attest:

BRUCE LEHMAN

*Attesting Officer*   *Commissioner of Patents and Trademarks*